(12) United States Patent
Horiuchi

(10) Patent No.: US 8,126,333 B2
(45) Date of Patent: Feb. 28, 2012

(54) OPTICAL TRANSMISSION SYSTEM AND SYNCHRONIZATION METHOD USING TIME REFERENCE PULSE

(75) Inventor: Yukio Horiuchi, Saitama (JP)

(73) Assignee: KDDI Corporation, Tokyo (JP)

( * ) Notice: Subject to any disclaimer, the term of this patent is extended or adjusted under 35 U.S.C. 154(b) by 431 days.

(21) Appl. No.: 12/471,928

(22) Filed: May 26, 2009

(65) Prior Publication Data
US 2009/0297164 A1 Dec. 3, 2009

(30) Foreign Application Priority Data
May 30, 2008 (JP) ................................. 2008-141858

(51) Int. Cl.
*H04J 14/08* (2006.01)
(52) U.S. Cl. .............. 398/102; 398/67; 398/98; 398/99; 398/100; 398/101
(58) Field of Classification Search ............. 398/98–102
See application file for complete search history.

(56) References Cited

U.S. PATENT DOCUMENTS
7,936,765 B2 * 5/2011 Kim et al. ................ 370/395.41
(Continued)

FOREIGN PATENT DOCUMENTS
JP        A-2006-5673        1/2006
(Continued)

*Primary Examiner* — Tod T Van Roy
(74) *Attorney, Agent, or Firm* — Oliff & Berridge, PLC

(57) ABSTRACT

An OLT includes a first transmitter and receiver unit for transmitting and receiving signals with ONUs, a first communication control timer, a measurement unit for measuring a round trip time (RTT) between the OLT and each of ONUs, an advance notice time generation unit for generating an advance notice time signal by adding a predetermined time to a time information that indicates a time in the first communication control timer in response to a first time reference pulse, and a unit for controlling the first transmitter and receiver unit to transmit the generated advance notice time signal to each of the ONUs, and to transmit signals indicating measured RTT/2 to the respective ones of the ONUs.

24 Claims, 12 Drawing Sheets

U.S. PATENT DOCUMENTS

| | | | |
|---|---|---|---|
| 2003/0048801 A1* | 3/2003 | Sala et al. | 370/445 |
| 2004/0109688 A1* | 6/2004 | Kim et al. | 398/68 |
| 2007/0280108 A1 | 12/2007 | Sakurai | |
| 2011/0150499 A1* | 6/2011 | Sala et al. | 398/154 |
| 2011/0200326 A1* | 8/2011 | Kazawa et al. | 398/25 |

FOREIGN PATENT DOCUMENTS

| | | |
|---|---|---|
| JP | A-2007-166278 | 6/2007 |
| JP | A-2007-235371 | 9/2007 |
| JP | A-2008-42699 | 2/2008 |

* cited by examiner

OPTICAL TRANSMISSION SYSTEM AND SYNCHRONIZATION METHOD USING TIME REFERENCE PULSE

PRIORITY CLAIM

This application claims priority from Japanese patent application No. 2008-141858, filed on May 30, 2008, which is incorporated herein by reference.

BACKGROUND OF THE INVENTION

1. Field of the Invention

The present invention relates to an optical transmission system and to a synchronization method using a time reference pulse. More concretely, the present invention relates to an optical transmission system with an optical terminal unit in network side and a plurality of optical terminal units in user side, in which the optical terminal unit in network side controls up-signals from the optical terminal units in user side in Time Division Multiplexing Access (TDMA) manner, and to the synchronization method using a time reference pulse.

2. Description of the Related Art

As for an optical transmission system in which an optical terminal unit in network side controls up-signals from optical terminal units in user side in TDMA manner, a Passive Optical Network (PON) system is known.

The PON system includes an Optical Line Terminal (OLT) arranged at a center station, a plurality of Optical Network Units (ONUs) arranged in user sides, and a star coupler optical fiber transmission line for connecting the OLT with the plurality of ONUs. This PON system locates one or more optical couplers on an optical fiber transmission line to use a part of the optical fiber transmission line in common by all ONUs. In such PON system, it is necessary to synchronize the time in OLT with that in each ONU for uplink signal transmission.

US patent publication No. 2007/0280108 A1 discloses, although it is not a PON system, time-synchronization between subscriber terminals and a subscriber accommodation router using Network Time Protocol (NTP) that is a time-synchronization protocol of network base.

Japanese patent publication No. 2007-166278 discloses, although it is not a PON system, frequency-synchronization and time-synchronization between a master station apparatus and a slave station apparatus using NTP that is a time-synchronization protocol of network base or Precision Time Protocol (PTP).

Japanese patent publication No. 2007-235371 discloses a time-synchronization method under the standard of IEEE802.3ah™ concerning a PON system. Namely, this publication discloses that a PON counter of terminal devices is subjected to drift adjustment so as to lessen a time lag between a timestamp and the PON counter, at a point of time when the timestamp contained in the control frame of down-signals is sent, and that the transmission timing of an up-signal is determined on the basis of the adjusted PON counter.

Japanese patent publication Nos. 2008-042699 and 2006-005673 disclose time-synchronization techniques compliant with multi-rates in the PON system. Namely, in Japanese patent publication No. 2008-042699, it is described that when a time synchronization frame is time-division-multiplexed over a data frame received from a non-PON side and it is transmitted to a PON side by setting a time information to it, influence given to the time information to be set is avoided by setting the time information after the frame space is adjusted. In Japanese patent publication No. 2006-005673, it is described that, in the ONU, a timer is started to count when extracting a timestamp from a control packet and the timestamp value extracted at this time is referred as a standard of output timing of up-data if the difference between the counted value of the timer and that of the timer started to count in response to the last extracting of a timestamp is smaller than a threshold.

In the PON system, since the TDMA scheme is used, there occurs no problem when down-signals are transmitted from OLT. However, when transmitting up-signals from ONUs, it may be necessary for each ONU to wait until a time slot assigned for the ONU itself. This causes that the delayed amount cannot be fixed and therefore it is difficult to rapidly obtain time-synchronization.

SUMMARY OF THE INVENTION

It is therefore an object of the present invention to provide an optical transmission system and a synchronization method using a time reference pulse, whereby it is possible to establish rapid and accurate time-synchronization even when a TDMA scheme is adopted in the transmission.

According to the present invention, an optical transmission system includes an optical terminal unit in network side and a plurality of optical terminal units in user side connected with the optical terminal unit in network side via an optical transmission line. The optical terminal unit in network side includes a first transmitter and receiver means for transmitting and receiving signals with the plurality of optical terminal units in user side, a first communication control timer, a measurement means for measuring a round trip time (RTT) between the optical terminal unit in network side and each of the plurality of optical terminal units in user side, an advance notice time generation means for generating an advance notice time signal by adding a predetermined time to a time information that indicates a time in the first communication control timer in response to a first time reference pulse, and means for controlling the first transmitter and receiver means to transmit the generated advance notice time signal to each of the plurality of optical terminal units in user side, and to transmit signals indicating half values of the measured round trip times (RTT/2) to the respective ones of the plurality of optical terminal units in user side. Each of the plurality of optical terminal units in user side includes a second transmitter and receiver means for transmitting and receiving signals with the optical terminal unit in network side and for receiving the advance notice time signal and the signal indicating a half value of the measured round trip time (RTT/2) from the optical terminal unit in network side, a second communication control timer indicating a time delayed from that of the first communication control time by a delay time corresponding to a trip time from the optical terminal units in network side to this optical terminal unit in user side, a decision means for calculating a corrected advance notice time by subtracting a time corresponding to the half value of the round trip time (RTT/2) from the advance notice time received by the second transmitter and receiver means, and for judging whether the time indicated by the second communication control timer coincides with the corrected advance notice, and a time-reference pulse generation means for generating a second time reference pulse when the decision means judges that the time indicated by the second communication control timer coincides with the corrected advance notice.

A time reference pulse that is synchronized with a time reference pulse applied to the optical terminal unit in network side can be generated at each of the optical terminal units in user side, by using a simple circuit structure, and it is possible to establish rapid and accurate time-synchronization.

It is preferred that the measurement means in the optical terminal unit in network side includes means for controlling the first transmitter and receiver means to transmit a time synchronization command containing the time information indicated in the first communication control timer to each of the plurality of optical terminal units in user side, and that each of the plurality of optical terminal units in user side includes means for setting the second communication control timer to a time of the time information contained in the received time synchronization command.

It is also preferred that the optical terminal unit in network side further includes a clock generation means for generating a clock used in counting operation of the first communication control timer in response to a reference clock that is in synchronization with the first time reference pulse. In this case, more preferably, the reference clock is provided to the optical terminal unit in network side from an external circuit or from an oscillation means for generating the reference clock in synchronous with the first time reference pulse.

According to the present invention, also, an optical transmission system includes an optical terminal unit in network side and a plurality of optical terminal units in user side connected to the optical terminal unit in network side via an optical transmission line. The optical terminal unit in network side includes a first transmitter and receiver means for transmitting and receiving signals with the plurality of optical terminal units in user side, a first communication control timer, a measurement means for measuring a round trip time (RTT) between the optical terminal unit in network side and each of the plurality of optical terminal units in user side, an advance notice time generation means for generating an advance notice time signal that indicates a time in the first communication control timer in response to a first time reference pulse, and means for controlling the first transmitter and receiver means to transmit the generated advance notice time signal to each of the plurality of optical terminal units in user side, and to transmit signals indicating half values of the measured round trip times (RTT/2) to the respective ones of the plurality of optical terminal units in user side. Each of the plurality of optical terminal units in user side includes a second transmitter and receiver means for transmitting and receiving signals with the optical terminal unit in network side and for receiving the advance notice time signal and the signal indicating a half value of the measured round trip time (RTT/2) from the optical terminal unit in network side, a second communication control timer indicating a time delayed from that of the first communication control time by a delay time corresponding to a trip time from the optical terminal units in network side to this optical terminal unit in user side, a decision means for calculating a corrected advance notice time by adding a predetermined time to the advance notice time received by the second transmitter and receiver means and by subtracting a time corresponding to the half value of the round trip time (RTT/2) from the added advance notice time, and for judging whether the time indicated by the second communication control timer coincides with the corrected advance notice, and a time-reference pulse generation means for generating a second time reference pulse when the decision means judges that the time indicated by the second communication control timer coincides with the corrected advance notice.

A time reference pulse that is synchronized with a time reference pulse applied to the optical terminal unit in network side can be generated at each of the optical terminal units in user side, by using a simple circuit structure, and it is possible to establish rapid and accurate time-synchronization.

It is preferred that the measurement means in the optical terminal unit in network side includes means for controlling the first transmitter and receiver means to transmit a time synchronization command containing the time information indicated in the first communication control timer to each of the plurality of optical terminal units in user side, and that each of the plurality of optical terminal units in user side includes means for setting the second communication control timer to a time of the time information contained in the received time synchronization command.

It is also preferred that the optical terminal unit in network side further includes a clock generation means for generating a clock used in counting operation of the first communication control timer in response to a reference clock that is in synchronization with the first time reference pulse. In this case, more preferably, the reference clock is provided to the optical terminal unit in network side from an external circuit or from an oscillation means for generating the reference clock in synchronous with the first time reference pulse.

According to the present invention, further, an optical transmission system includes an optical terminal unit in network side and a plurality of optical terminal units in user side connected to the optical terminal unit in network side via an optical transmission line. The optical terminal unit in network side includes a first transmitter and receiver means for transmitting and receiving signals with the plurality of optical terminal units in user side, a first communication control timer, a measurement means for measuring a round trip time (RTT) between the optical terminal unit in network side and each of the plurality of optical terminal units in user side, an advance notice time generation means for generating an advance notice time signal by adding a predetermined time to a time information that indicates a time in the first communication control timer in response to a first time reference pulse, and means for controlling the first transmitter and receiver means to transmit the generated advance notice time signal to each of the plurality of optical terminal units in user side, to transmit signals indicating half values of the measured round trip times (RTT/2) to the respective ones of the plurality of optical terminal units in user side, and to transmit control messages, substantially all of which contain timestamps, to each of the plurality of optical terminal units in user side. Each of the plurality of optical terminal units in user side includes a second transmitter and receiver means for transmitting and receiving signals with the optical terminal unit in network side and for receiving the advance notice time signal and the signal indicating a half value of the measured round trip time (RTT/2) from the optical terminal unit in network side, a local oscillation means for generating a local clock, a second communication control timer set by the timestamps contained in substantially all the control messages, for counting the local clock from the local oscillation means, a decision means for calculating a corrected advance notice time by subtracting a time corresponding to the half value of the round trip time (RTT/2) from the advance notice time received by the second transmitter and receiver means, and for judging whether the time indicated by the second communication control timer coincides with the corrected advance notice, and a time-reference pulse generation means for generating a second time reference pulse when the decision means judges that the time indicated by the second communication control timer coincides with the corrected advance notice.

A time reference pulse that is synchronized with a time reference pulse applied to the optical terminal unit in network side can be generated at each of the optical terminal units in user side, by using a simple circuit structure, and it is possible to establish rapid and accurate time-synchronization.

It is preferred that the measurement means in the optical terminal unit in network side includes means for controlling the first transmitter and receiver means to transmit a time synchronization command containing the time information indicated in the first communication control timer to each of the plurality of optical terminal units in user side, and that each of the plurality of optical terminal units in user side includes means for setting the second communication control timer to a time of the time information contained in the received time synchronization command.

It is also preferred that the optical terminal unit in network side further includes a clock generation means for generating a clock used in counting operation of the first communication control timer in response to a reference clock that is in synchronization with the first time reference pulse. In this case, more preferably, the reference clock is provided to the optical terminal unit in network side from an external circuit or from an oscillation means for generating the reference clock in synchronous with the first time reference pulse.

According to the present invention still further an optical transmission system includes an optical terminal unit in network side and a plurality of optical terminal units in user side connected to the optical terminal unit in network side via an optical transmission line. The optical terminal unit in network side includes a first transmitter and receiver means for transmitting and receiving signals with the plurality of optical terminal units in user side, a first communication control timer, a measurement means for measuring a round trip time (RTT) between the optical terminal unit in network side and each of the plurality of optical terminal units in user side, an advance notice time generation means for generating an advance notice time signal that indicates a time in the first communication control timer in response to a first time reference pulse, and means for controlling the first transmitter and receiver means to transmit the generated advance notice time signal to each of the plurality of optical terminal units in user side, to transmit signals indicating half values of the measured round trip times (RTT/2) to the respective ones of the plurality of optical terminal units in user side, and to transmit control messages, substantially all of which contain timestamps, to each of the plurality of optical terminal units in user side. Each of the plurality of optical terminal units in user side includes a second transmitter and receiver means for transmitting and receiving signals with the optical terminal unit in network side and for receiving the advance notice time signal and the signal indicating a half value of the measured round trip time (RTT/2) from the optical terminal unit in network side, a local oscillation means for generating a local clock, a second communication control timer set by the timestamps contained in substantially all the control messages, for counting the local clock from the local oscillation means, a decision means for calculating a corrected advance notice time by adding a predetermined time to the advance notice time received by the second transmitter and receiver means and by subtracting a time corresponding to the half value of the round trip time (RTT/2) from the added advance notice time, and for judging whether the time indicated by the second communication control timer coincides with the corrected advance notice, and a time-reference pulse generation means for generating a second time reference pulse when the decision means judges that the time indicated by the second communication control timer coincides with the corrected advance notice.

A time reference pulse that is synchronized with a time reference pulse applied to the optical terminal unit in network side can be generated at each of the optical terminal units in user side, by using a simple circuit structure, and it is possible to establish rapid and accurate time-synchronization.

It is preferred that the measurement means in the optical terminal unit in network side includes means for controlling the first transmitter and receiver means to transmit a time synchronization command containing the time information indicated in the first communication control timer to each of the plurality of optical terminal units in user side, and that each of the plurality of optical terminal units in user side includes means for setting the second communication control timer to a time of the time information contained in the received time synchronization command.

It is also preferred that the optical terminal unit in network side further includes a clock generation means for generating a clock used in counting operation of the first communication control timer in response to a reference clock that is in synchronization with the first time reference pulse. In this case, more preferably, the reference clock is provided to the optical terminal unit in network side from an external circuit or from an oscillation means for generating the reference clock in synchronous with the first time reference pulse.

According to the present invention, a synchronization method using a time reference pulse, for an optical transmission system including an optical terminal unit in network side and a plurality of optical terminal units in user side connected to the optical terminal unit in network side via an optical transmission line includes a step of measuring, at the optical terminal unit in network side, a round trip time (RTT) between the optical terminal unit in network side and each of the plurality of optical terminal units in user side, a step of transmitting, from the optical terminal unit in network side, signals indicating half values of the measured round trip times (RTT/2) to the respective ones of the plurality of optical terminal units in user side, a step of receiving, at each of the plurality of optical terminal units in user side, the signal indicating a half value of the measured round trip time (RTT/2) from the optical terminal unit in network side, the received signal indicating a half value of the measured round trip time (RTT/2) being stored, a step of transmitting, from the optical terminal unit in network side, an advance notice time signal obtained by adding a predetermined time to a time information that indicates a time in a first communication control timer in response to a first time reference pulse, to each of the plurality of optical terminal units in user side, a step of receiving, at each of the plurality of optical terminal units in user side, the advance notice time signal, a step of calculating, at each of the plurality of optical terminal units in user side, a corrected advance notice time by subtracting a time corresponding to the half value of the round trip time (RTT/2) from the advance notice time received, and a step of generating, at each of the plurality of optical terminal units in user side, a second time reference pulse when a time indicated by a second communication control timer that indicates the time delayed from that of the first communication control time by a delay time corresponding to a trip time from the optical terminal units in network side to this optical terminal unit in user side coincides with the corrected advance notice.

According to the present invention, also, a synchronization method using a time reference pulse, for an optical transmission system including an optical terminal unit in network side and a plurality of optical terminal units in user side connected to the optical terminal unit in network side via an optical transmission line includes a step of measuring, at the optical terminal unit in network side, a round trip time (RTT) between the optical terminal unit in network side and each of the plurality of optical terminal units in user side, a step of transmitting, from the optical terminal unit in network side, signals indicating half values of the measured round trip times (RTT/2) to the respective ones of the plurality of optical terminal units in user side, a step of receiving, at each of the plurality of optical terminal units in user side, the signal indicating a half value of the measured round trip time (RTT/2) from the optical terminal unit in network side, the received signal indicating a half value of the measured round trip time (RTT/2) being stored, a step of transmitting, from the optical terminal unit in network side, an advance notice time signal that indicates a time in a first communication control timer in response to a first time reference pulse, to each of the plurality of optical terminal units in user side, a step of receiving, at each of the plurality of optical terminal units in user side, the advance notice time signal, a step of calculating, at each of the plurality of optical terminal units in user side, a corrected advance notice time by adding a predetermined time to the advance notice time received and by subtracting a time corresponding to the half value of the round trip time (RTT/2) from the added advance notice time, and a step of generating, at each of the plurality of optical terminal units in user side, a second time reference pulse when a time indicated by a second communication control timer that indicates the time delayed from that of the first communication control time by a delay time corresponding to a trip time from the optical terminal units in network side to this optical terminal unit in user side coincides with the corrected advance notice.

According to the present invention, further, a synchronization method using a time reference pulse, for an optical transmission system including an optical terminal unit in network side and a plurality of optical terminal units in user side connected to the optical terminal unit in network side via an optical transmission line, includes a step of measuring, at the optical terminal unit in network side, a round trip time (RTT) between the optical terminal unit in network side and each of the plurality of optical terminal units in user side, a step of transmitting, from the optical terminal unit in network side, signals indicating half values of the measured round trip times (RTT/2) to the respective ones of the plurality of optical terminal units in user side, a step of receiving, at each of the plurality of optical terminal units in user side, the signal indicating a half value of the measured round trip time (RTT/2) from the optical terminal unit in network side, the received signal indicating a half value of the measured round trip time (RTT/2) being stored, a step of transmitting, from the optical terminal unit in network side, an advance notice time signal obtained by adding a predetermined time to a time information that indicates a time in a first communication control timer in response to a first time reference pulse, to each of the plurality of optical terminal units in user side, a step of transmitting, from the optical terminal unit in network side, control messages, substantially all of which contain timestamps, to each of the plurality of optical terminal units in user side, a step of receiving, at each of the plurality of optical terminal units in user side, the advance notice time signal, a step of calculating, at each of the plurality of optical terminal units in user side, a corrected advance notice time by subtracting a time corresponding to the half value of the round trip time (RTT/2) from the advance notice time received, and a step of generating, at each of the plurality of optical terminal units in user side, a second time reference pulse when a time indicated by a second communication control timer that is set by the timestamps contained in substantially all the control messages and counts local clock coincides with the corrected advance notice.

According to the present invention, still further, a synchronization method using a time reference pulse, for an optical transmission system includes an optical terminal unit in network side and a plurality of optical terminal units in user side connected to the optical terminal unit in network side via an optical transmission line includes a step of measuring, at the optical terminal unit in network side, a round trip time (RTT) between the optical terminal unit in network side and each of the plurality of optical terminal units in user side, a step of transmitting, from the optical terminal unit in network side, signals indicating half values of the measured round trip times (RTT/2) to the respective ones of the plurality of optical terminal units in user side, a step of receiving, at each of the plurality of optical terminal units in user side, the signal indicating a half value of the measured round trip time (RTT/2) from the optical terminal unit in network side, the received signal indicating a half value of the measured round trip time (RTT/2) being stored, a step of transmitting, from the optical terminal unit in network side, an advance notice time signal that indicates a time in a first communication control timer in response to a first time reference pulse, to each of the plurality of optical terminal units in user side, a step of transmitting, from the optical terminal unit in network side, control messages, substantially all of which contain timestamps, to each of the plurality of optical terminal units in user side, a step of receiving, at each of the plurality of optical terminal units in user side, the advance notice time signal, a step of calculating, at each of the plurality of optical terminal units in user side, a corrected advance notice time by subtracting a time corresponding to the half value of the round trip time (RTT/2) from the advance notice time received, and a step of generating, at each of said plurality of optical terminal units in user side, a second time reference pulse when a time indicated by a second communication control timer that is set by the timestamps contained in substantially all the control messages and counts local clock coincides with the corrected advance notice.

Further objects and advantages of the present invention will be apparent from the following description of the preferred embodiments of the invention as illustrated in the accompanying drawings.

DESCRIPTION OF THE PREFERRED EMBODIMENTS

Figure 1:
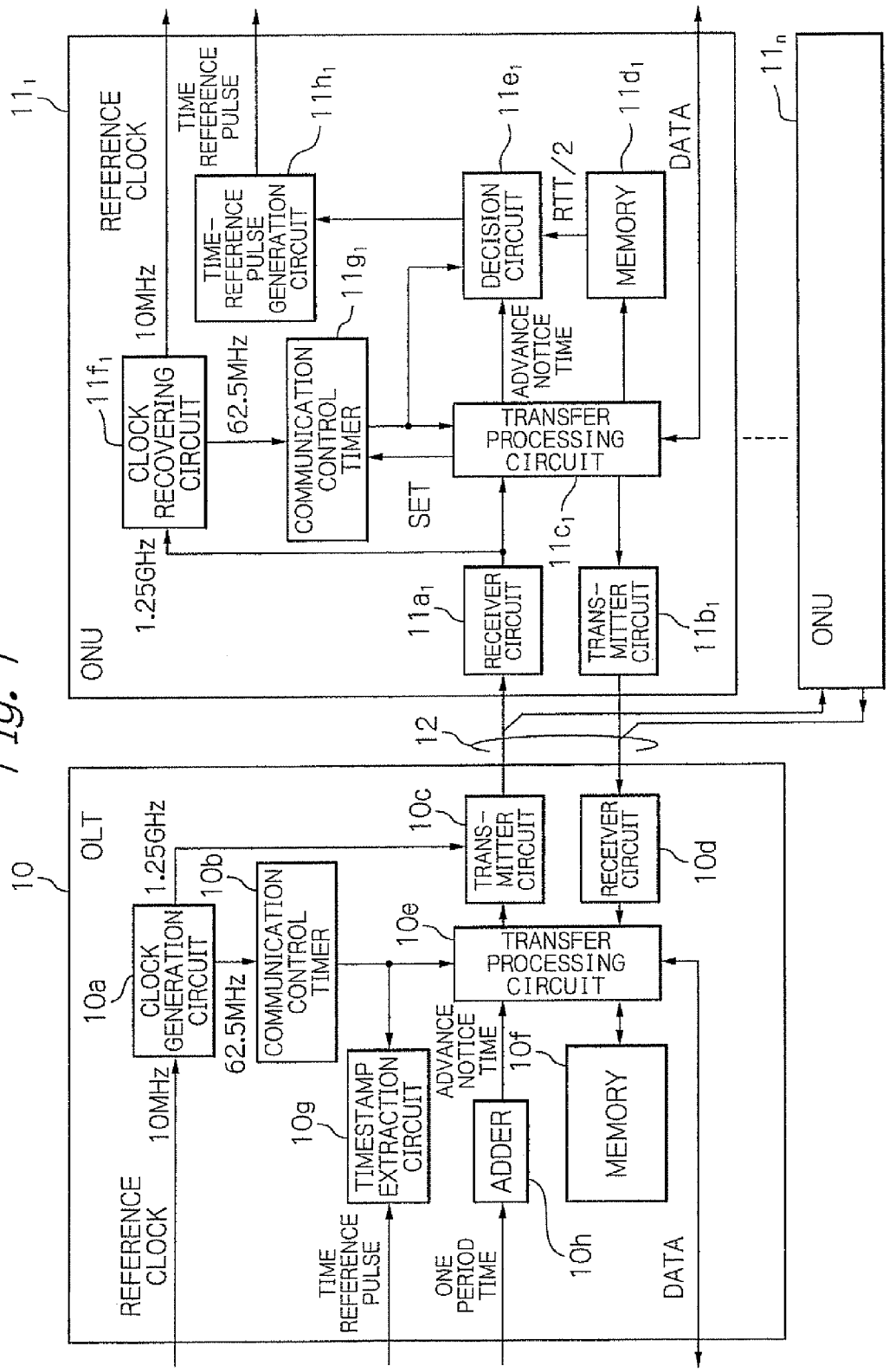
FIG. 1 is a block diagram schematically illustrating a configuration of a PON system as an embodiment of an optical transmission system according to the present invention.

FIG. 1 schematically illustrates a configuration of a PON system as an embodiment of an optical transmission system according to the present invention.

As shown in the figure, the PON system in this embodiment has basically an OLT 10, a plurality of ONUs $11_1$-$11_n$ (n is an integer of two or more) assigned to a plurality of users, and an optical transmission line 12 for connecting the OLT 10 and the ONUs $11_1$-$11_n$.

The optical transmission line 12 has at least one optical coupler (not shown) for coupling or branching signal light(s) at its intermediate point and is configured by a passive coupling device in general. Typically, one optical fiber is used for the optical transmission line 12 by performing wavelength divisional multiplexing for down and up transmissions. However, for easy understanding, the optical transmission line 12 is represented by two transmission lines of downlink and uplink in the figure.

The OLT 10 has a clock generation circuit 10a for generating clocks necessary in the PON system, a communication control timer 10b for time-keeping the present time, a transmitter circuit 10c, a receiver circuit 10d, a transfer processing circuit 10e for transferring down-signals to the transmitter circuit 10c and for receiving an up-signal from the receiver circuit 10d, a memory 10f for storing measured Round Trip Times (RTTs) between the OLT 10 and each of the ONUs $11_1$-$11_n$, a timestamp extraction circuit 10g for extracting timestamps, and an adder 10h for adding a time of one period to each timestamp.

Each of the ONUs $11_1$-$11_n$, for example the ONU $11_1$, has a receiver circuit $11a_1$, a transmitter circuit $11b_1$, a transfer processing circuit $11c_1$ for receiving down-signals from the receiver circuit $11a_1$ and for transferring an up-signal to the transmitter circuit $11b_1$, a memory $11d_1$ for storing a half value of RTT, a decision circuit $11e_1$ for determining a corrected advance notice time and for generating in synchronization a time reference pulse, a clock recovering circuit $11f_1$ for generating clocks necessary in the PON system and for recovering a reference clock, a communication control timer $11g_1$ for time-keeping in synchronization with the timestamp, and a time-reference pulse generation circuit $11h_1$ for generating a time reference pulse.

In the PON system of this embodiment, a communication protocol called as Multi-Point Control Protocol (MPCP) is used and uplink communication is performed by TDMA. That is, each of the ONUs $11_1$-$11_n$ can output an up-signal light to the optical transmission line 12 toward the OLT 10 only at the timing and in the period permitted by the OLT 10.

Distances between the ONUs $11_1$-$11_n$ and the OLT 10 differ to each other. Thus, in order to instruct a precise transmission timing for each of the ONUs $11_1$-$11_n$, it is necessary for the OLT 10 to synchronize the communication control timers in the ONUs $11_1$-$11_n$ with the communication control timer in the OLT 10 and to previously know the respective round trip times RTTs from the respective ONUs $11_1$-$11_n$ to the OLT 10 by measuring them. Thus, the OLT 10 sends a command including a time synchronization command for measuring RTT to each of the ONUs $11_1$-$11_n$ and requests to reply a signal with a predetermined format. As a result, it is possible for the OLT 10 to measure RTTs between the OLT 10 and the respective ONUs $11_1$-$11_n$.

Figure 2:
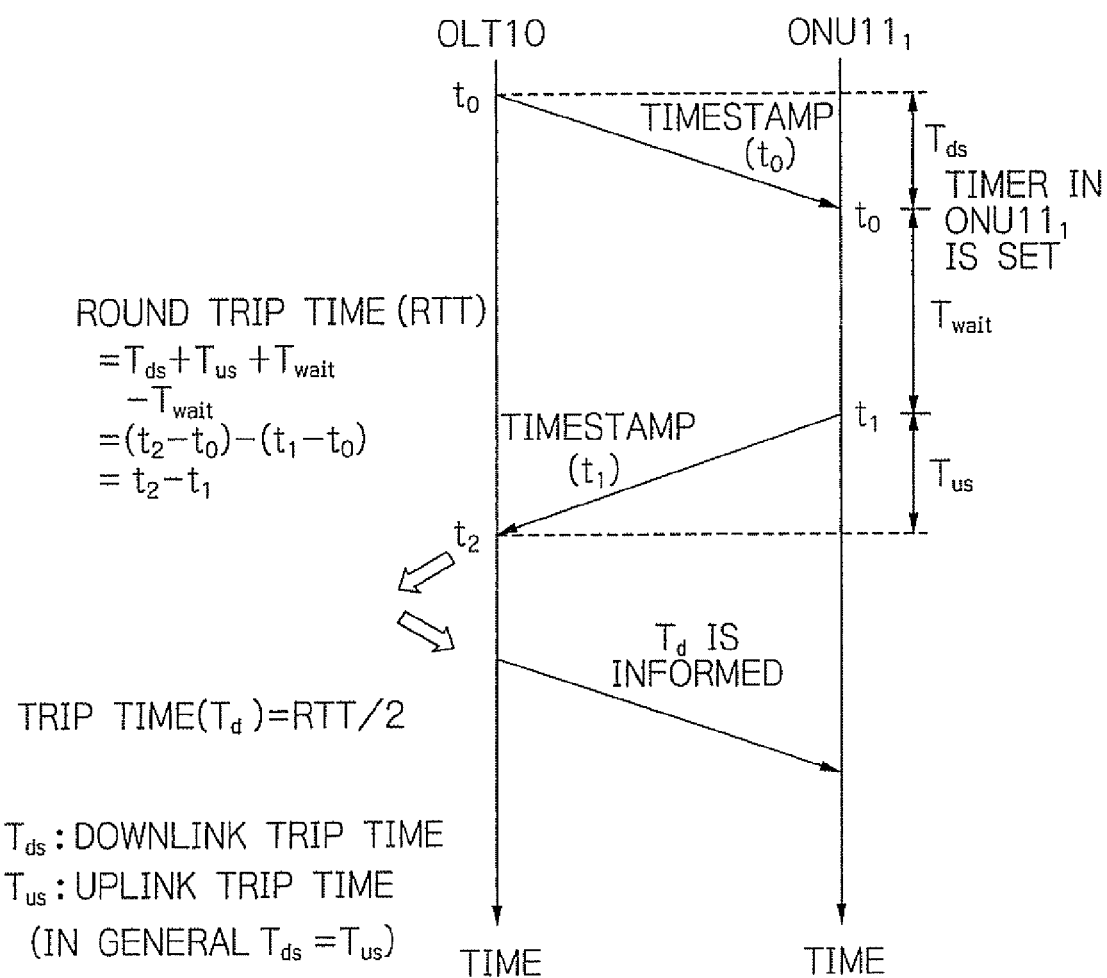
FIG. 2 is a view illustrating how to measure a round trip time in the embodiment of FIG. 1.

Hereinafter, a method of measuring RTT in the PON system will be described in detail. As aforementioned, the OLT 10 has the communication control timer 10b and each of the ONUs $11_1$-$11_n$ has the communication control timer, such as the communication control timer $11g_1$ in case of the ONU $11_1$, operated in synchronization with the communication control timer 10b. Referring to FIG. 2, measurement of an RTT between the OLT 10 and the ONU $11_1$ will be described here. In the PON system, the communication control timer $11g_1$ in the ONU $11_1$ indicates a time delayed by a time corresponding to a propagation time or trip time $T_d$ taken in the optical transmission line 12 from the communication control timer 10b in the OLT 10.

As shown in FIG. 2, suppose that the OLT 10 sends a time-synchronization command to ONU $11_1$ at a time $t_0$ in order to time-synchronize the communication control timer 10b with the communication control timer $11g_1$ and to measure an RTT. The time-synchronization command includes information of time $t_0$ as a timestamp. When the ONU $11_1$ receives the time-synchronization command, the communication control timer $11g_1$ is set at the time $t_0$ included in the time-synchronization command.

In case that the ONU $11_1$ is initially registered on the OLT 10, because the OLT 10 has not known the RTT of this ONU $11_1$ yet, the OLT 10 cannot direct to the ONU $11_1$ a correct transmission timing for preventing collision with another ONU. Thus, in this case, the ONU $11_1$ waits for a random time period $T_{wait}$ that intends to minimize the capability of collision with up-signals from other ONUs $11_2$-$11_n$, and then sends a replay signal to the OLT 10 at a time $t_1$. This replay signal includes an outgoing or sending time $t_1$ from the ONU $11_1$ as a timestamp. Suppose that the OLT 10 receives this replay signal at a time $t_2$. Then, the OLT 10 calculates a difference $(t_2-t_1)$ from the received time $t_2$ and the sending time $t_1$ that is referred to the timestamp $t_1$ included in the replay signal. This difference $(t_2-t_1)$ corresponds to the round trip time RTT of the optical transmission line 12. As shown in FIG. 2, this RTT is calculated from $RTT=T_{ds}+T_{us}+T_{wait}-T_{wait}=(t_2-t_0)-(t_1-t_0)=t_2-t_1$, where $T_{wait}$ is the aforementioned waiting time period, $T_{ds}$ is a down-link trip time, and $T_{us}$ is uplink trip time. It is apparent that this RTT includes signal transfer times in the OLT 10 and ONU $11_1$.

As shown in FIG. 1, a reference clock and a time reference pulse synchronized with each other are input into the OLT 10 from external circuits. The reference clock is a clock of 10 MHz generated from for example a GPS (Global Positioning System) receiver, whereas the time reference pulse is a pulse of 1 PPS (Pulse Per Second) indicating the UTC (Coordinated Universal Time).

The clock generation circuit 10a generates a clock of 62.5 MHz and a clock of 1.25 GHz used in the PON system, in response to the reference clock of for example 10 MHz input from the external circuit such as the GPS receiver. The frequencies of these clocks will of course depend on the design of the PON system.

The communication control timer 10b time-keeps the present time by counting the 62.5 MHz clock from the clock generation circuit 10a and outputs a time signal of a predetermined format, which indicates the present time.

The transmitter circuit 10c converts a down-electrical signal from the transfer processing circuit 10e to a down-optical signal and outputs the converted optical signal to the optical transmission line 12 in synchronization with the 1.25 GHz clock from the clock generation circuit 10a.

The receiver circuit 10d converts an up-optical signal received from the optical transmission line 12 to an up-electrical signal and provides the converted electrical signal to the transfer processing circuit 10e.

The transfer processing circuit 10e controls so that this OLT 10 can transmit and receive data with each of the ONUs $11_1$-$11_n$ with reference to the time signal provided from the communication control timer 10b. Also, during an initial procedure for searching the ONUs $11_1$-$11_n$ connected to the optical transmission line 12 and for setting a logical link with each of the searched ONUs $11_1$-$11_n$, this transfer processing circuit 10e previously measures an RTT between the OLT 10 and each of the ONUs $11_1$-$11_n$ using the transmitter circuit 10c and the receiver circuit 10d, and stores the measured RTTs of the ONUs $11_1$-$11_n$ in the memory 10f. An RTT/2 that is a half value of the measured RTT of each of the ONUs $11_1$-$11_n$ is sent to each of the ONUs $11_1$-$11_n$ and stored in each memory of the ONUs $11_1$-$11_n$. This stored RTT/2 will be referred at time-synchronization.

The timestamp extraction circuit 10g is triggered at an edge of the time reference pulse provided from the external circuit to load the time signal from the communication control timer 10b so as to extract a timestamp. In a transmission system, generally, since it is impossible to transmit a signal without delay, a time corresponding to a next correct second (t+1), namely a time corresponding to just one second after is transmitted to all the ONUs $11_1$-$11_n$ in this embodiment. Therefore, in this embodiment, the adder 10h adds a time corresponding to one period of the time reference pulse to the timestamp extracted by the timestamp extraction circuit 10g.

For example, in case of an Ethernet (Registered Trademark) PON (E-PON) system, because an optical transmission rate is 1.25 Gbit/s and the communication control timer 10b of the OLT 10 and the communication control timer of each of the ONUs $11_1$-$11_n$ perform their counting operations at 1/1.25 GHz (single bit time)×20 bits, which corresponds to 62.5 MHz, a timer unit becomes 16 nanoseconds. At this time, since one second becomes 62,500,000 counts, the adder 10h adds 62,500,000 counts to the output of the timestamp extraction circuit 10g. The added result from the adder 10h is provided to the transfer processing circuit 10e as an advance notice time.

The transfer processing circuit 10e and the transmitter circuit 10c broadcast a signal indicating the advance notice time provided from the adder 10h to the ONUs $11_1$-$11_n$. Any ONU requiring no advance notice time will ignores this broadcasted advance notice time signal. Of course, it is possible to designate ONUs that require the advance notice time and to multicast the advance notice time signal to the designated ONUs, or it is possible to unicast copied advance notice time signals to the ONUs, respectively. In modification, a plurality of copied advance notice time signals may be sent to each of the ONUs $11_1$-$11_n$ with an interval to increase reliability in transfer of the advance notice time. Each of the ONUs $11_1$-$11_n$ may receive at least one of them. It is important that the advance notice time is transmitted without fault even if a signal frame including the advance notice time is missed due to some cause such as a receive error.

Hereinafter, basic operations of the ONU $11_1$ will be described as a representative each of the ONUs $11_1$-$11_n$.

The receiver circuit $11a_1$ receives a down-optical signal from the optical transmission line 12, coverts it to a down-electrical signal, and provides the converted electrical signal to the transfer processing circuit $11c_1$ and the clock recovering circuit $11f_1$.

The transfer processing circuit $11c_1$ transfers down-data included in the received down-signal from the receiver circuit $11a_1$ to a subsequent stage such as a computer (not shown) of this ONU $11_1$. The transfer processing circuit $11c_1$ also provides up-data from such as the computer to the transmitter circuit $11b_1$.

The transmitter circuit $11b_1$ converts the up-electrical signal given from the transfer processing circuit $11c_1$ to up-optical signal, and outputs the converted optical signal to the optical transmission line 12. This up-optical signal is transmitted through the optical transmission line 12 to the receiver circuit 10d in the OLT 10 and converted into an up-electrical signal.

The transfer processing circuit $11c_1$ in the ONU $11_1$ operates depending upon contents in a control signal when the destination of the down-signal received by the receiver circuit $11a_1$ is this ONU $11_1$. For example, if the received signal indicates the half value of RTT, the transfer processing circuit $11c_1$ stores the received RTT/2 in the memory $11d_1$. If the received signal indicates a signal of the advance notice time, the transfer processing circuit $11c_1$ informs the received advance notice time to the decision circuit $11e_1$. Operations of this decision circuit $11e_1$ will be described later.

A timestamp for the communication control timer $11g_1$ is included in each control frame transmitted from the OLT 10. In each of the ONUs $11_1$-$11_n$, the communication control timer is set to synchronize with this timestamp.

In the ONU $11_1$, the clock recovering circuit $11f_1$ generates a PON system clock of 62.5 MHz required in this PON system in response to pulse shape of the received signal from the receiver circuit $11a_1$ and recovers the reference clock of 10 MHz. The PON system clock of 62.5 MHz is provided to the communication control timer $11g_1$, and the reference clock of 10 MHz is provided to a subsequent stage connected with this ONU $11_1$. The communication control timer $11g_1$ time-keeps the time by counting the PON system clock of 62.5 MHz from this clock generation circuit $11f_1$.

A time signal from the communication control timer $11g_1$ is provided to the transfer processing circuit $11c_1$ and the decision circuit $11e_1$. The transfer processing circuit $11c_1$ provides, with reference to the time signal from the communication control timer $11g_1$, an up-electrical signal to the transmitter circuit $11b_1$ so that this transmitter circuit $11b_1$ outputs an up-optical signal to the optical transmission line 12 at a timing and period permitted by the OLT 10.

When the decision circuit $11e_1$ receives the advance notice time signal from the transfer processing circuit $11c_1$, this decision circuit $11e_1$ reads out the half value of RTT from the memory $11d_1$ and subtracts the half value of RTT from the advance notice time to have a corrected advance notice time. Namely, the decision circuit $11e_1$ performs calculation of (Corrected advance notice time)=(Advance notice time)−RTT/2.

When a time of the time signal from the communication control timer $11g_1$ coincides with the corrected advance notice time, the decision circuit $11e_1$ boots the time-reference pulse generation circuit $11h_1$ to generate a time reference pulse. Thus, each of the ONUs $11_1$-$11_n$ can produce a time reference pulse that is delayed by the trip time $T_d$ from the OLT 10 to each of ONUs $11_1$-$11_n$ but in synchronization with the time reference pulse applied to the OLT 10. Since the time including a delay time in the optical transmission line 12 was added at the adder 10h in the OLT 10, the time-reference pulse generation circuit $11h_1$ can produce, in response to the boot signal from the decision circuit $11e_1$, a time reference pulse synchronized with the time reference pulse applied to the OLT 10 without delay. In case that processing delays in the OLT 10 and the ONU $11_1$ cannot be ignored, the decision circuit $11e_1$ will determine the corrected advance notice time in considering an error due to these processing delays.

Figure 3:
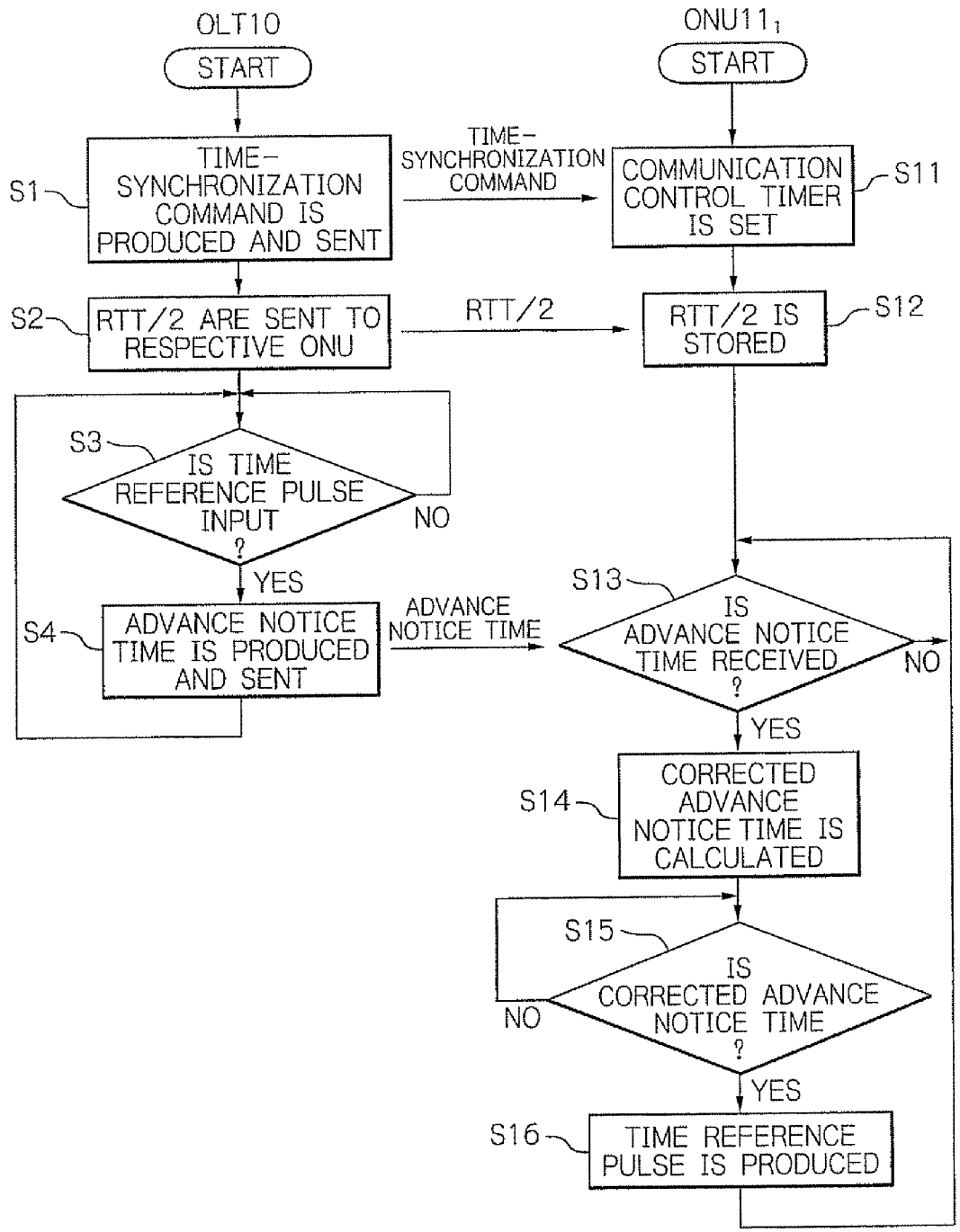
FIGS. 3a and 3b are flow charts illustrating operations in the embodiment of FIG. 1.

FIGS. 3a and 3b illustrate operations in the ONU $11_1$ for generating a time reference pulse that is in synchronization with the time reference pulse input into the OLT 10 in this embodiment. FIG. 3a shows the operation in the OLT 10 and FIG. 3b shows the operation in the ONU $11_1$.

As shown in FIG. 3a, first, the OLT 10 produces and sends a time-synchronization command to each of the ONUs $11_1$-$11_n$ including the ONU $11_1$ for time synchronization between the communication control timers 10b and $11g_1$ and for RTT measurement (Step S1).

When receiving the time-synchronization command, the ONU $11_1$ sets the communication control timer $11g_1$ at the time contained in this time-synchronization command (Step S11). Then, the ONU $11_1$ waits for a random time period $T_{wait}$ for minimizing the capability of collision of up-signals sent from the ONUs $11_1$-$11_n$, and then sends a replay signal to the OLT 10. Thus, the OLT 10 can measure, as mentioned before, RTTs between this OLT 10 and the respective ONUs $11_1$-$11_n$. The measure RTTs of the ONUs $11_1$-$11_n$ are stored in the memory 10f for up-communication control, and half values of RTTs (RTT/2) are sent to the respective ONUs $11_1$-$11_n$ (Step S2).

The ONU $11_1$ stores the half value of RTT (RTT/2) sent from the OLT 10 into the memory $11d_1$ (Step S12).

The OLT 10 waits until it is judged that the time reference pulse is input (Step S3). When the time reference pulse is input, the advance notice time is produced by the timestamp extraction circuit 10g and the adder 10h and sent to each of the ONUs $11_1$-$11_n$ (Step S4).

The ONU $11_1$ waits until it is judged that the advance notice time signal is received (Step S13). When the advance notice time is received, the decision circuit $11e_1$ calculates the corrected advance notice time (Step S14) by subtracting the half value of RTT (RTT/2) from the received advance notice time as aforementioned.

In the ONU $11_1$, when the time indicated by the communication control timer $11g_1$ coincides with the corrected advance notice time (Step S15), the decision circuit $11e_1$ instructs the time-reference pulse generation circuit $11h_1$ to produce the time reference pulse (Step S16).

As mentioned above, the OLT 10 operates to loop Steps S3-S4, and each of the ONUs $11_1$-$11_n$ operates to loop Steps S13-S16.

Figure 4:
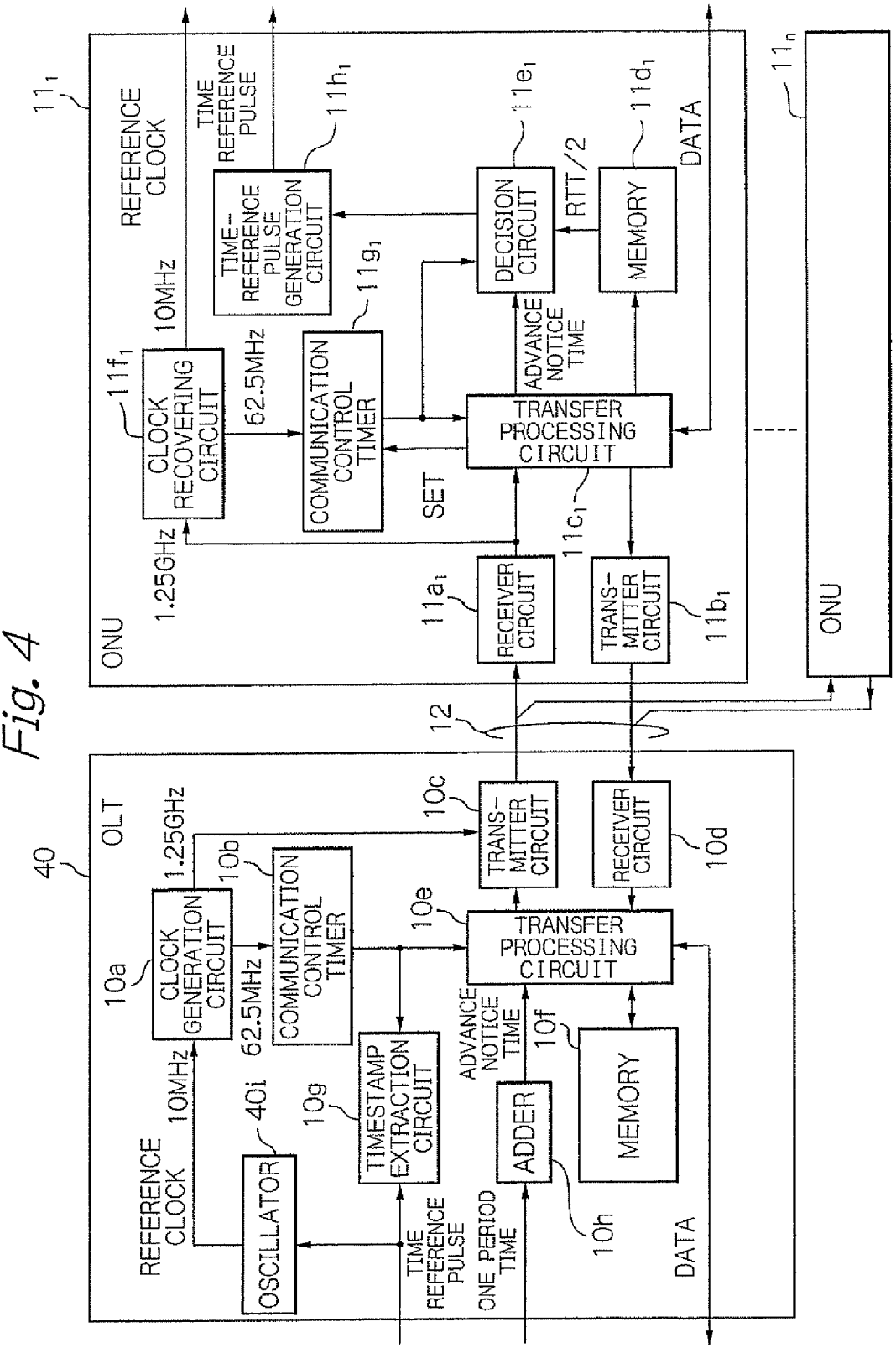
FIG. 4 is a block diagram schematically illustrating a configuration of a PON system in a modification of the embodiment of FIG. 1.

FIG. 4 schematically illustrates a configuration of a PON system in a modification of the embodiment of FIG. 1. In this modification, elements with the same operations and functions as those in the embodiment of FIG. 1 are indicated using the same reference symbols.

The PON system in this modification has basically an OLT 40, a plurality of ONUs $11_1$-$11_n$ (n is an integer of two or more) assigned to a plurality of users, and an optical transmission line 12 for connecting the OLT 40 and the ONUs $11_1$-$11_n$.

The OLT 40 has a clock generation circuit 10a for generating clocks necessary in the PON system, a communication control timer 10b for time-keeping the present time, a transmitter circuit 10c, a receiver circuit 10d, a transfer processing circuit 10e for transferring down-signals to the transmitter circuit 10c and for receiving an up-signal from the receiver circuit 10d, a memory 10f for storing measured RTTs between the OLT 40 and each of the ONUs $11_1$-$11_n$, a timestamp extraction circuit 10g for extracting timestamps, an adder 10h for adding a time of one period to each timestamp, and a synthesizer or oscillator 40i.

Each of the ONUs $11_1$-$11_n$, for example the ONU $11_1$, has a receiver circuit $11a_1$, a transmitter circuit $11b_1$, a transfer processing circuit $11c_1$ for receiving down-signals from the receiver circuit $11a_1$ and for transferring an up-signal to the transmitter circuit $11b_1$, a memory $11d_1$ for storing a half value of RTT, a decision circuit $11e_1$ for determining a corrected advance notice time and for generating in synchronization a time reference pulse, a clock recovering circuit $11f_1$ for generating clocks necessary in the PON system and for recovering a reference clock, a communication control timer $11g_1$ for time-keeping in synchronization with the timestamp, and a time-reference pulse generation circuit $11h_1$ for generating a time reference pulse.

In the PON system of this modification, since the OLT 40 has built-in the synthesizer or oscillator 40i for generating a reference clock of 10 MHz in response to the time reference pulse, it is not necessary to provide a reference clock from an external circuit.

Figure 5:
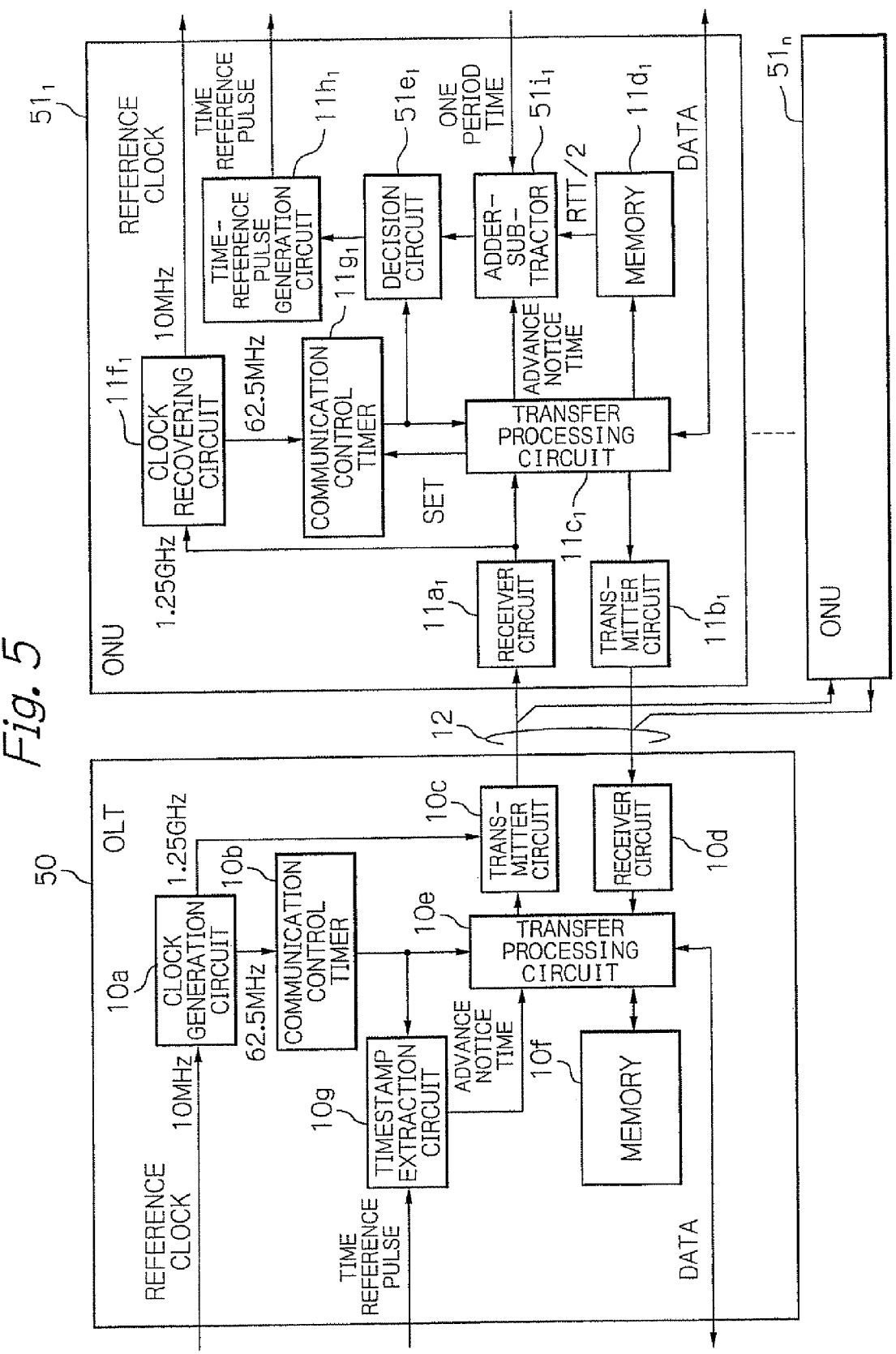
FIG. 5 is a block diagram schematically illustrating a configuration of a PON system as another embodiment of an optical transmission system according to the present invention.

FIG. 5 schematically illustrates a configuration of a PON system as another embodiment of an optical transmission system according to the present invention. In this embodiment, elements with the same operations and functions as those in the embodiment of FIG. 1 are indicated using the same reference symbols.

The PON system in this modification has basically an OLT 50, a plurality of ONUs $51_1$-$51_n$ (n is an integer of two or more) assigned to a plurality of users, and an optical transmission line 12 for connecting the OLT 50 and the ONUs $51_1$-$51_n$.

The OLT 50 has a clock generation circuit 10a for generating clocks necessary in the PON system, a communication control timer 10b for time-keeping the present time, a transmitter circuit 10c, a receiver circuit 10d, a transfer processing circuit 10e for transferring down-signals to the transmitter circuit 10c and for receiving an up-signal from the receiver circuit 10d, a memory 10f for storing measured RTTs between the OLT 50 and each of the ONUs $51_1$-$51_n$, and a timestamp extraction circuit 10g for extracting timestamps.

Each of the ONUs $51_1$-$51_n$, for example the ONU $51_1$, has a receiver circuit $11a_1$, a transmitter circuit $11b_1$, a transfer processing circuit $11c_1$ for receiving down-signals from the receiver circuit $11a_1$ and for transferring an up-signal to the transmitter circuit $11b_1$, a memory $11d_1$ for storing a half value of RTT, a decision circuit $51e_1$ for determining a corrected advance notice time and for generating in synchronization a time reference pulse, a clock recovering circuit $11f_1$ for generating clocks necessary in the PON system and for recovering a reference clock, a communication control timer $11g_1$ for time-keeping in synchronization with the timestamp, a time-reference pulse generation circuit $11h_1$ for generating a time reference pulse, and an adder-subtractor $51i_1$.

In the embodiment of FIG. 1, the OLT 10 sends, to each of the ONUs $11_1$-$11_n$, an added result obtained by adding a predetermined time of about one second to a time at which the OLT 10 receives a time reference pulse.

Contrary to this in the embodiment of FIG. 5, the OLT 50 sends, to each of the ONUs $51_1$-$51_n$, a time at which the OLT 50 receives a time reference pulse as an advance notice time signal. In each of the ONUs $51_1$-$51_n$, for example in the ONU $51_1$, the adder-subtractor $51i_1$ adds a predetermined time corresponding to one period time to a time indicated by the received advance notice time signal and subtracts the trip time from the added result to obtain a corrected advance notice time. When a time of the time signal from the communication control timer $11g_1$ coincides with the corrected advance notice time from the adder-subtractor $51i_1$, the decision circuit $51e_1$ boots the time-reference pulse generation circuit $11h_1$ to generate a time reference pulse.

Figure 6:
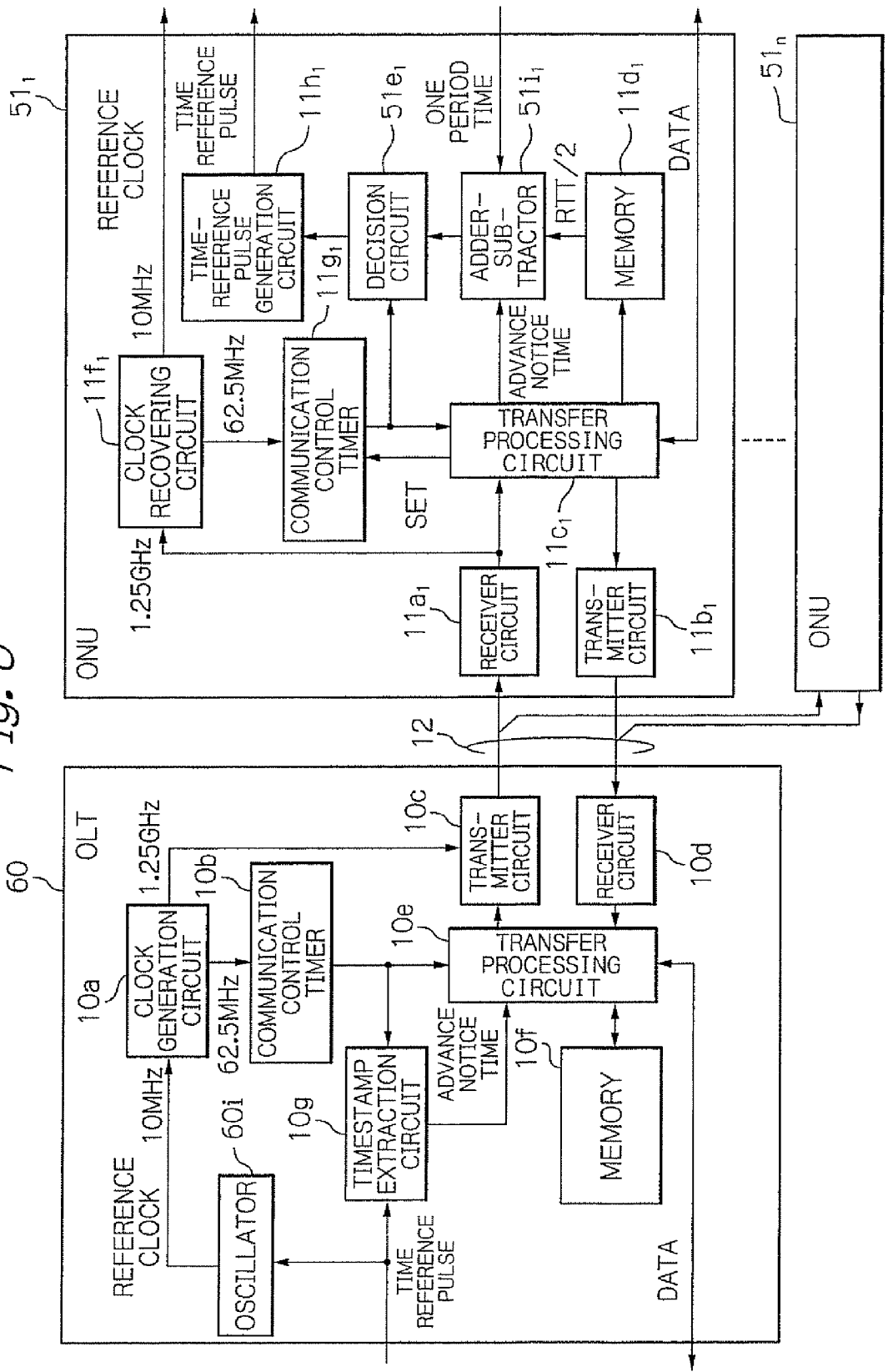
FIG. 6 is a block diagram schematically illustrating a configuration of a PON system in a modification of the embodiment of FIG. 5.

FIG. 6 schematically illustrates a configuration of a PON system in a modification of the embodiment of FIG. 5. In this modification, elements with the same operations and functions as those in the embodiments of FIGS. 1 and 5 are indicated using the same reference symbols.

The PON system in this modification has basically an OLT 60, a plurality of ONUs $51_1$-$51_n$ (n is an integer of two or more) assigned to a plurality of users, and an optical transmission line 12 for connecting the OLT 60 and the ONUs $51_1$-$51_n$.

The OLT 60 has a clock generation circuit 10a for generating clocks necessary in the PON system, a communication control timer 10b for time-keeping the present time, a transmitter circuit 10c, a receiver circuit 10d, a transfer processing circuit 10e for transferring down-signals to the transmitter circuit 10c and for receiving an up-signal from the receiver circuit 10d, a memory 10f for storing measured RTTs between the OLT 60 and each of the ONUs $51_1$-$51_n$, a timestamp extraction circuit 10g for extracting timestamps, and a synthesizer or oscillator 60i.

Each of the ONUs $51_1$-$51_n$, for example the ONU $51_1$, has a receiver circuit $11a_1$, a transmitter circuit $11b_1$, a transfer processing circuit $11c_1$ for receiving down-signals from the receiver circuit $11a_1$ and for transferring an up-signal to the transmitter circuit $11b_1$, a memory $11d_1$ for storing a half value of RTT, a decision circuit $51e_1$ for determining a corrected advance notice time and for generating in synchronization a time reference pulse, a clock recovering circuit $11f_1$ for generating clocks necessary in the PON system and for recovering a reference clock, a communication control timer $11g_1$ for time-keeping in synchronization with the timestamp, a time-reference pulse generation circuit $11h_1$ for generating a time reference pulse, and an adder-subtractor $51i_1$.

In the PON system of this modification, since the OLT 60 has built-in the synthesizer or oscillator 60i for generating a reference clock of 10 MHz in response to the time reference pulse, it is not necessary to provide a reference clock from an external circuit.

Figure 7:
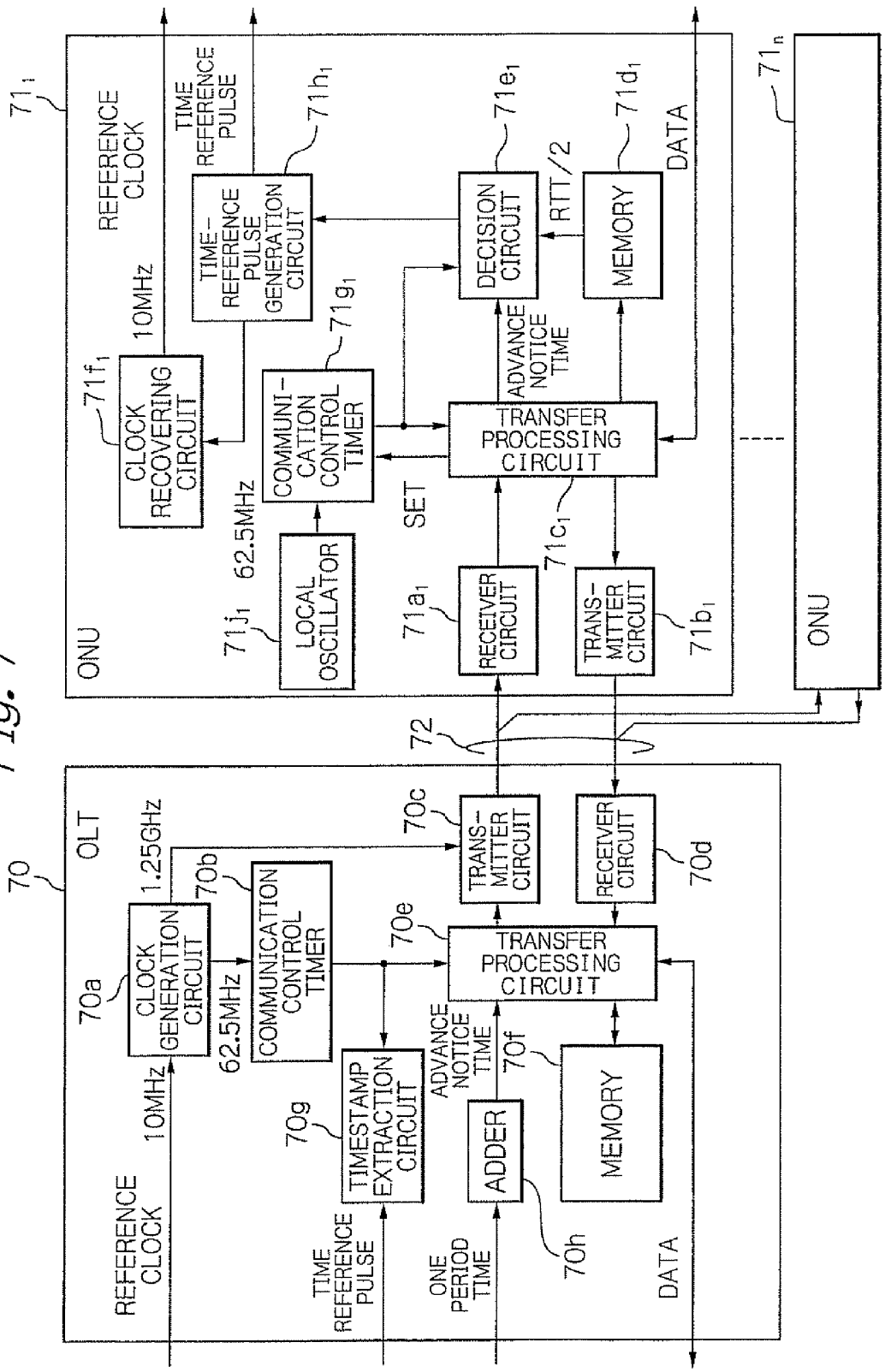
FIG. 7 is a block diagram schematically illustrating a configuration of a PON system as further embodiment of an optical transmission system according to the present invention.

FIG. 7 schematically illustrates a configuration of a PON system as further embodiment of an optical transmission system according to the present invention.

As shown in the figure, the PON system in this embodiment has basically an OLT 70, a plurality of ONUs $71_1$-$71_n$ (n is an integer of two or more) assigned to a plurality of users, and an optical transmission line 72 for connecting the OLT 70 and the ONUs $71_1$-$71_n$.

The optical transmission line 72 has at least one optical coupler (not shown) for coupling or branching signal light(s) at its intermediate point and is configured by a passive coupling device in general. Typically, one optical fiber is used for the optical transmission line 72 by performing wave-length divisional multiplexing for down and up transmissions. However, for easy understanding, the optical transmission line 72 is represented by two transmission lines of downlink and uplink in the figure.

The OLT 70 has a clock generation circuit 70a for generating clocks necessary in the PON system, a communication control timer 70b for time-keeping the present time, a transmitter circuit 70c, a receiver circuit 70d, a transfer processing circuit 70e for transferring down-signals to the transmitter circuit 70c and for receiving an up-signal from the receiver circuit 70d, a memory 70f for storing measured Round Trip Times (RTTs) between the OLT 70 and each of the ONUs $71_1$-$71_n$, a timestamp extraction circuit 70g for extracting timestamps, and an adder 70h for adding a time of one period to each timestamp.

Each of the ONUs $71_1$-$71_n$, for example the ONU $71_1$, has a receiver circuit $71a_1$, a transmitter circuit $71b_1$, a transfer processing circuit $71c_1$ for receiving down-signals from the receiver circuit $71a_1$ and for transferring an up-signal to the transmitter circuit $71b_1$, a memory $71d_1$ for storing a half value of RTT, a decision circuit $71e_1$ for determining a corrected advance notice time and for generating in synchronization a time reference pulse, a clock recovering circuit $71f_1$ for recovering a reference clock, a communication control timer $71g_1$ for time-keeping in synchronization with the timestamp, a time-reference pulse generation circuit $11h_1$ for generating a time reference pulse, and a local synthesizer or local oscillator $71j_1$.

Since a measuring method of an RTT when each of the ONUs $71_1$-$71_n$ is initially registered on the OLT 70 is the completely the same as that in the embodiment of FIG. 1, description of the measurement method is omitted.

Time synchronization between the communication control timer 70b of the OLT 70 and the communication control timer of the ONU, for example, the communication control timer $71g_1$ of the ONU $71_1$ is different from that in the embodiment of FIG. 1. Namely, as will be described later in detail, in this embodiment, time synchronization is frequently carried out in response to timestamps contained in every control frames.

As well as done in the embodiment of FIG. 1, a reference clock and a time reference pulse synchronized with each other are input into the OLT 70 from external circuits. The reference clock is a clock of 10 MHz generated from for example a GPS receiver, whereas the time reference pulse is a pulse of 1 PPS indicating the UTC.

The clock generation circuit 70a generates a clock of 62.5 MHz and a clock of 1.25 GHz used in the PON system, in response to the reference clock of for example 10 MHz input from the external circuit such as the GPS receiver. The frequencies of these clocks will of course depend on the design of the PON system.

The communication control timer 70b time-keeps the present time by counting the 62.5 MHz clock from the clock generation circuit 70a and outputs a time signal of a predetermined format, which indicates the present time.

The transmitter circuit 70c converts a down-electrical signal from the transfer processing circuit 70e to a down-optical signal and outputs the converted optical signal to the optical transmission line 72 in synchronization with the 1.25 GHz clock from the clock generation circuit 70a.

The receiver circuit 70d converts an up-optical signal received from the optical transmission line 72 to an up-electrical signal and provides the converted electrical signal to the transfer processing circuit 70e.

The transfer processing circuit 70e controls so that this OLT 70 can transmit and receive data with each of the ONUs $71_1$-$71_n$ with reference to the time signal provided from the communication control timer 70b. Also, during an initial procedure for searching the ONUs $71_1$-$71_n$ connected to the optical transmission line 72 and for setting a logical link with each of the searched ONUs $71_1$-$71_n$, this transfer processing circuit 70e previously measures an RTT between the OLT 70 and each of the ONUs $71_1$-$71_n$ using the transmitter circuit 70c and the receiver circuit 70d, and stores the measured RTTs of the ONUs $71_1$-$71_n$ in the memory 70f. An RTT/2 that is a half value of the measured RTT of each of the ONUs $71_1$-$71_n$ is sent to each of the ONUs $71_1$-$71_n$ and stored in each memory of the ONUs $71_1$-$71_n$. This stored RTT/2 will be referred at time-synchronization.

The timestamp extraction circuit 70g is triggered at an edge of the time reference pulse provided from the external circuit to load the time signal from the communication control timer 70b so as to extract a timestamp. In a transmission system, generally, since it is impossible to transmit a signal without delay, a time corresponding to a next correct second (t+1), namely a time corresponding to just one second after is transmitted to all the ONUs $71_1$-$71_n$ in this embodiment. Therefore, in this embodiment, the adder 70h adds a time corresponding to one period of the time reference pulse to the timestamp extracted by the timestamp extraction circuit 70g.

For example, in case of an E-PON system, because an optical transmission rate is 1.25 Gbit/s and the communication control timer 70b of the OLT 70 and the communication control timer of each of the ONUs $71_1$-$71_n$ perform their counting operations at 1/1.25 GHz (single bit time)×20 bits, which corresponds to 62.5 MHz, a timer unit becomes 16 nanoseconds. At this time, since one second becomes 62,500,000 counts, the adder 70h adds 62,500,000 counts to the output of the timestamp extraction circuit 70g. The added result from the adder 70h is provided to the transfer processing circuit 70e as an advance notice time.

The transfer processing circuit 70e and the transmitter circuit 70c broadcast a signal indicating the advance notice time provided from the adder 70h to the ONUs $71_1$-$71_n$. Any ONU requiring no advance notice time will ignores this broadcasted advance notice time signal. Of course, it is possible to designate ONUs that require the advance notice time and to multicast the advance notice time signal to the designated ONUs, or it is possible to unicast copied advance notice time signals to the ONUS, respectively. In modification, a plurality of copied advance notice time signals may be sent to each of the ONUs $71_1$-$71_n$ with an interval to increase reliability in transfer of the advance notice time. Each of the ONUs $71_1$-$71_n$ may receive at least one of them. It is important that the advance notice time is transmitted without fault even if a signal frame including the advance notice time is missed due to some cause such as a receive error.

Hereinafter, basic operations of the ONU $71_1$ will be described as a representative each of the ONUs $71_1$-$71_n$.

The receiver circuit $71a_1$ receives a down-optical signal from the optical transmission line 72, coverts it to a down-electrical signal, and provides the converted electrical signal to the transfer processing circuit $71c_1$.

The transfer processing circuit $71c_1$ transfers down-data included in the received down-signal from the receiver circuit $71a_1$ to a subsequent stage such as a computer (not shown) of this ONU $71_1$. The transfer processing circuit $71c_1$ also provides up-data from such as the computer to the transmitter circuit $71b_1$.

The transmitter circuit $71b_1$ converts the up-electrical signal given from the transfer processing circuit $71c_1$ to up-optical signal, and outputs the converted optical signal to the optical transmission line 72. This up-optical signal is transmitted through the optical transmission line 72 to the receiver circuit 70d in the OLT 70 and converted into an up-electrical signal.

The transfer processing circuit $71c_1$ in the ONU $71_1$ operates depending upon contents in a control signal when the destination of the down-signal received by the receiver circuit $71a_1$ is this ONU $71_1$. For example, if the received signal indicates the half value of RTT, the transfer processing circuit $71c_1$ stores the received RTT/2 in the memory $71d_1$. If the received signal indicates a signal of the advance notice time, the transfer processing circuit $71c_1$ informs the received advance notice time to the decision circuit $71e_1$. Operations of this decision circuit $71e_1$ will be described later.

According to this embodiment, timestamps are added at the transfer processing circuit 70e in the OLT 70 and therefore the timestamps are contained in the respective frames in substantially all control messages transmitted from the OLT 70. In each of the ONUs $71_1$-$71_n$, the communication control timer is set by these timestamps. Thus, each communication control timer in each of the ONUs $71_1$-$71_n$ can be synchronized with the communication control timer 70b in the OLT 70.

Figure 8:
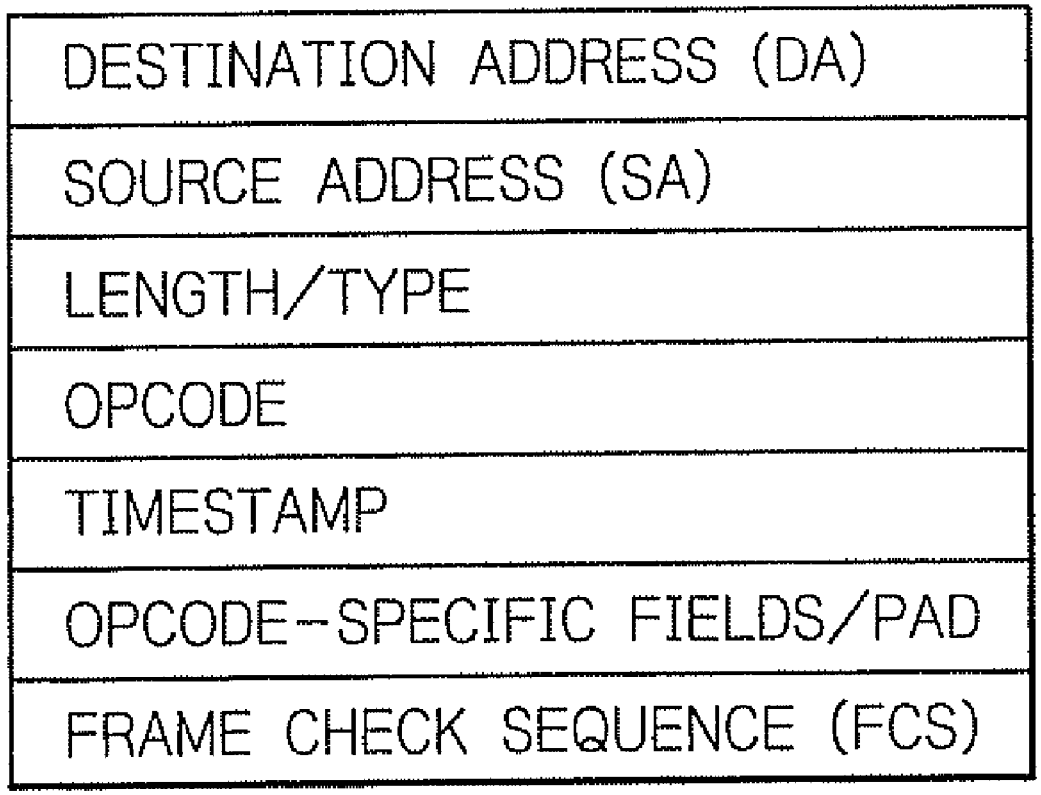
FIG. 8 is a view schematically illustrating a format of a control message.

As shown in FIG. 8, the format of the control message includes typically Destination address (DA) field, Source address (SA) field, Length/type field, Opcode field, Timestamp field, Opcode-specific fields and Frame check sequence (FCS) field. Timestamp value is added to Timestamp field in each of substantially all control messages at the communication control timer 70b in the OLT 70. As for the control messages, there are GAT message, REPORT message, REGISTER_REQ message, REGISTER message and REGISTER_ACK message. These messages are transmitted between the OLT and the ONU very often. A timestamp is added to each of substantially all control messages sent from the OLT 70 to each of the ONUs $71_1$-$71_n$ among these control messages.

Figure 9A:
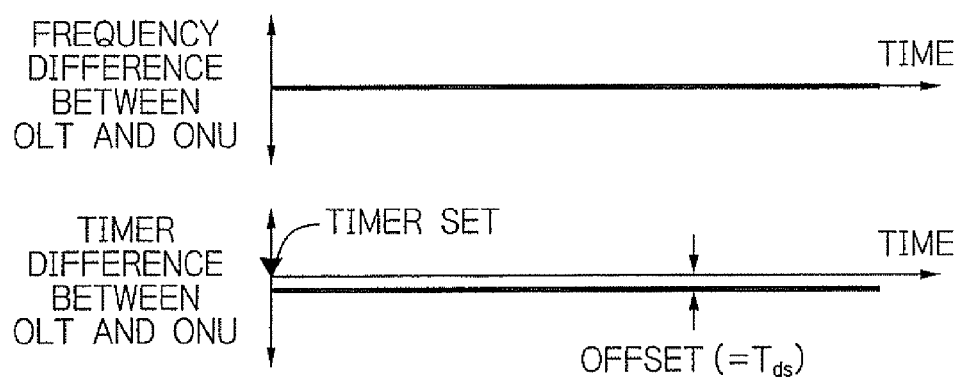
FIGS. 9a and 9b are views illustrating differences in the operations between the embodiment of FIG. 1 and the embodiment of FIG. 7.
Figure 9B:
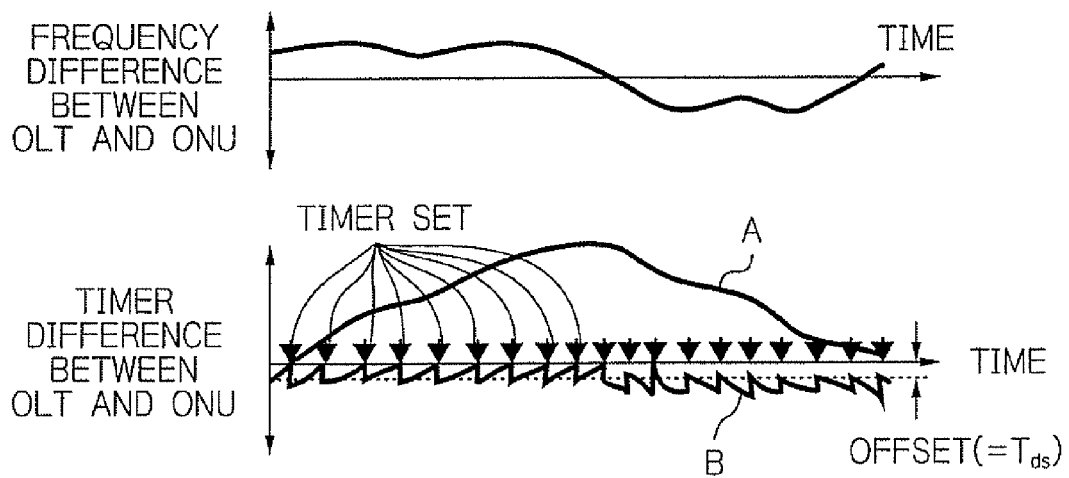

FIGS. 9a and 9b illustrate differences in the operations between the embodiment of FIG. 1 and the embodiment of FIG. 7.

According to the embodiment of FIG. 1, as shown in FIG. 9a, because the clock recovering circuit $11f_1$ produces the PON system clock of 62.5 MHz from the received signal, a frequency in the OLT 10 and a frequency in the ONU $11_1$ coincide to each other and therefore the frequency difference is zero. As a result, if the communication control timer $11g_1$ is once set by the timestamp, the timer difference between the OLT 10 and the ONU $11_1$ is kept at a constant offset value that is equal to the downlink trip time $T_{ds}$.

On the contrary, according to the embodiment of FIG. 7 as shown in FIG. 9b, a frequency in the OLT 70 and a frequency in the ONU $71_1$ differ from each other. Thus, if doing nothing, the timer difference between the OLT 70 and the ONU $71_1$ greatly changes as shown A in the figure. However, in the embodiment of FIG. 7, since the communication control timer $71g_1$ of the ONU $71_1$ is always set by the timestamps contained in the frames of substantially all the control messages sent from the OLT 70, the timer difference between the OLT 70 and the ONU $71_1$ is restricted to small to have a center value near a constant offset value that is equal to the downlink trip time $T_{ds}$ as shown B in the figure.

Therefore, in the ONU $71_1$, in case that a clock of 62.5 GHz is fed to the communication control timer $71g_1$ even from the non-synchronized local oscillator $71j_1$, the output of the communication control timer $71g_1$ is synchronized with the output of the communication control timer 70b in the OLT 70. Thus the communication control timer $71g_1$ can time-keep the time by counting the clock of 62.5 MHz from the local oscillator $71j_1$. The clock recovering circuit $71f_1$ in the ONU $71_1$ recovers the reference clock of 10 MHz in synchronous with a time reference pulse provided from the time-reference pulse generation circuit $71h_1$. The reference clock of 10 MHz thus recovered is provided to a subsequent stage connected with this ONU $71_1$.

A time signal from the communication control timer $71g_1$ is provided to the transfer processing circuit $71c_1$ and the decision circuit $71e_1$. The transfer processing circuit $71c_1$ provides, with reference to the time signal from the communication control timer $71g_1$, an up-electrical signal to the transmitter circuit $71b_1$ so that this transmitter circuit $71b_1$ outputs an up-optical signal to the optical transmission line 72 at a timing and period permitted by the OLT 70.

When the decision circuit $71e_1$ receives the advance notice time signal from the transfer processing circuit $71c_1$, this decision circuit $71e_1$ reads out the half value of RTT from the memory $71d_1$ and subtracts the half value of RTT from the advance notice time to have a corrected advance notice time. Namely, the decision circuit $71e_1$ performs calculation of (Corrected advance notice time)=(Advance notice time)−RTT/2.

When a time of the time signal from the communication control timer $71g_1$ coincides with the corrected advance notice time, the decision circuit $71e_1$ boots the time-reference pulse generation circuit $71h_1$ to generate the time reference pulse. Thus, each of the ONUs $71_1$-$11_n$ can produce the time reference pulse that is delayed by the trip time $T_d$ from the OLT 70 to each of ONUs $71_1$-$71_n$ but in synchronization with the time reference pulse applied to the OLT 70. Since the time including a delay time in the optical transmission line 72 was added at the adder 70h in the OLT 70, the time-reference pulse generation circuit $71h_1$ can produce, in response to the boot signal from the decision circuit $71e_1$, a time reference pulse synchronized with the time reference pulse applied to the OLT 70 without delay. In case that processing delays in the OLT 70 and the ONU $71_1$ cannot be ignored, the decision circuit $71e_1$ will determine the corrected advance notice time in considering an error due to these processing delays.

Since operations in the ONU $71_1$ for generating a time reference pulse that is in synchronization with the time reference pulse input into the OLT 70 in this embodiment is the same as that described with reference to FIGS. 3a and 3b in the embodiment of FIG. 1, description of this operations is omitted.

Figure 10:
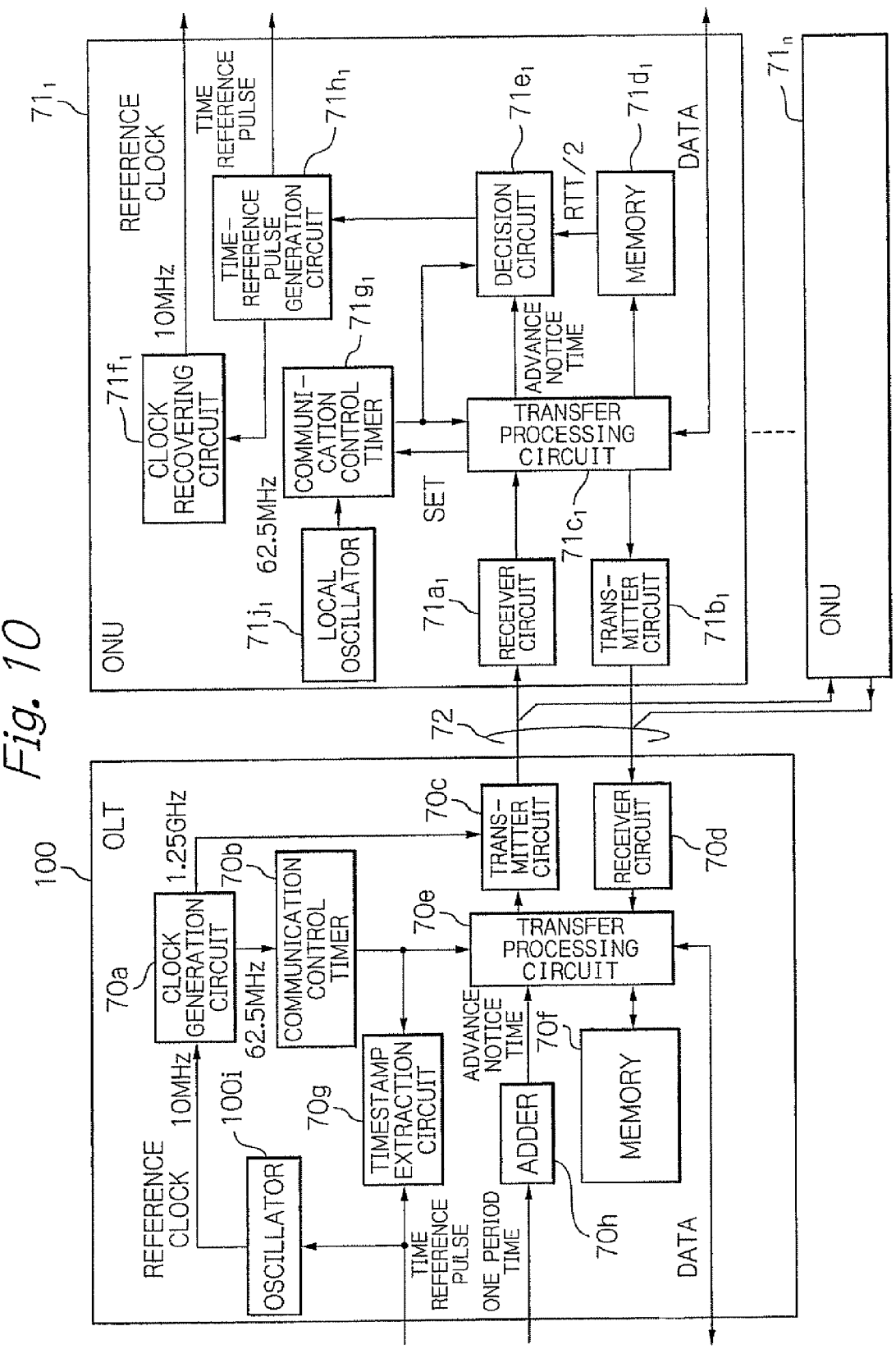
FIG. 10 is a block diagram schematically illustrating a configuration of a PON system in a modification of the embodiment of FIG. 7.

FIG. 10 schematically illustrates a configuration of a PON system in a modification of the embodiment of FIG. 7. In this modification, elements with the same operations and functions as those in the embodiment of FIG. 7 are indicated using the same reference symbols.

The PON system in this modification has basically an OLT 100, a plurality of ONUs $71_1$-$71_n$ (n is an integer of two or more) assigned to a plurality of users, and an optical transmission line 72 for connecting the OLT 100 and the ONUs $71_1$-$71_n$.

The OLT 100 has a clock generation circuit 70a for generating clocks necessary in the PON system, a communication control timer 70b for time-keeping the present time, a transmitter circuit 70c, a receiver circuit 70d, a transfer processing circuit 70e for transferring down-signals to the transmitter circuit 70c and for receiving an up-signal from the receiver circuit 70d, a memory 70f for storing measured RTTs between the OLT 100 and each of the ONUs $71_1$-$71_n$, a timestamp extraction circuit 70g for extracting timestamps, an adder 70h for adding a time of one period to each timestamp, and a synthesizer or oscillator 100i.

Each of the ONUs $71_1$-$71_n$, for example the ONU $71_1$, has a receiver circuit $71a_1$, a transmitter circuit $71b_1$, a transfer processing circuit $71c_1$ for receiving down-signals from the receiver circuit $71a_1$ and for transferring an up-signal to the transmitter circuit $71b_1$, a memory $71d_1$ for storing a half value of RTT, a decision circuit $71e_1$ for determining a corrected advance notice time and for generating in synchronization a time reference pulse, a clock recovering circuit $71f_1$ for recovering a reference clock, a communication control timer $71g_1$ for time-keeping in synchronization with the timestamp, a time-reference pulse generation circuit $71h_1$ for generating a time reference pulse, and a local oscillator $71j_1$.

In the PON system of this modification, since the OLT 100 has built-in the synthesizer or oscillator 100i for generating a reference clock of 10 MHz in response to the time reference pulse, it is not necessary to provide a reference clock from an external circuit.

Figure 11:
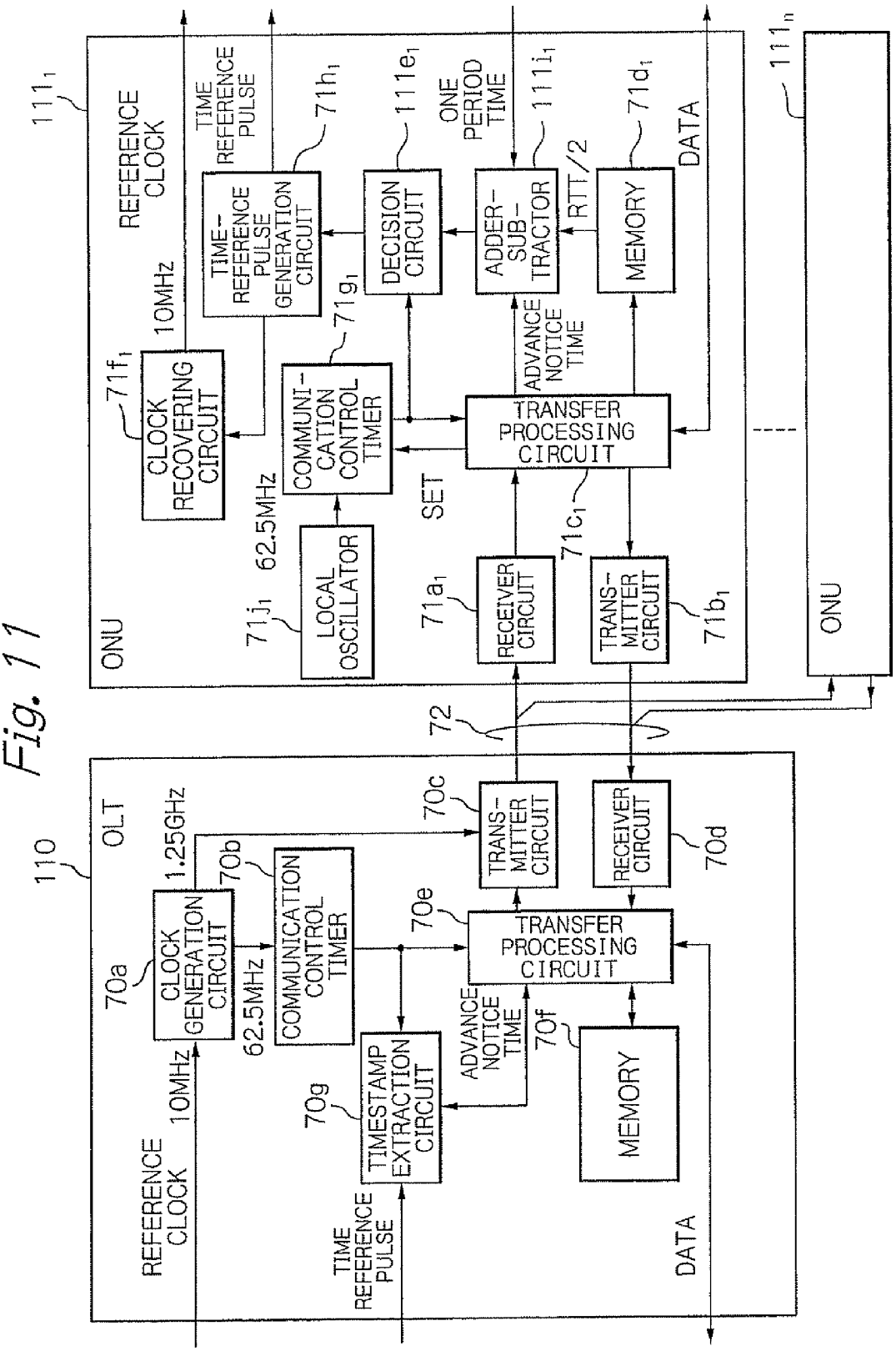
FIG. 11 is a block diagram schematically illustrating a configuration of a PON system as still further embodiment of an optical transmission system according to the present invention.

FIG. 11 schematically illustrates a configuration of a PON system as still further embodiment of an optical transmission system according to the present invention. In this embodiment, elements with the same operations and functions as those in the embodiment of FIG. 7 are indicated using the same reference symbols.

The PON system in this modification has basically an OLT 110, a plurality of ONUs $111_1$-$111_n$ (n is an integer of two or more) assigned to a plurality of users, and an optical transmission line 72 for connecting the OLT 110 and the ONUs $111_1$-$111_n$.

The OLT 110 has a clock generation circuit 70a for generating clocks necessary in the PON system, a communication control timer 70b for time-keeping the present time, a transmitter circuit 70c, a receiver circuit 70d, a transfer processing circuit 70e for transferring down-signals to the transmitter circuit 70c and for receiving an up-signal from the receiver circuit 70d, a memory 10f for storing measured RTTs between the OLT 110 and each of the ONUs $111_1$-$111_n$, and a timestamp extraction circuit 70g for extracting timestamps.

Each of the ONUs $111_1$-$111_n$, for example the ONU $1111_1$, has a receiver circuit $71a_1$, a transmitter circuit $71b_1$, a transfer processing circuit $71c_1$ for receiving down-signals from the receiver circuit $71a_1$ and for transferring an up-signal to the transmitter circuit $71b_1$, a memory $71d_1$ for storing a half value of RTT, a decision circuit $111e_1$ for determining a corrected advance notice time and for generating in synchronization a time reference pulse, an adder-subtractor $111i_1$, a clock recovering circuit $71f_1$ for recovering a reference clock, a communication control timer $71g_1$ for time-keeping in synchronization with the timestamp, a time-reference pulse generation circuit $71h_1$ for generating a time reference pulse, and a local oscillator $71j_1$.

In the embodiment of FIG. 7, the OLT 70 sends, to each of the ONUs $71_1$-$71_n$, an added result obtained by adding a predetermined time of about one second to a time at which the OLT 70 receives a time reference pulse.

Contrary to this in the embodiment of FIG. 11, the OLT 110 sends, to each of the ONUs $111_1$-$111_n$, a time at which the OLT 110 receives a time reference pulse as an advance notice time signal.

In each of the ONUs $111_1$-$111_n$, for example in the ONU $111_1$, the adder-subtractor $111i_1$ adds a predetermined time corresponding to one period time to a time indicated by the received advance notice time signal and subtracts the trip time from the added result to obtain a corrected advance notice time. When a time of the time signal from the communication control timer $71g_1$ coincides with the corrected advance notice time from the adder-subtractor $111i_1$, the decision circuit $111e_1$ boots the time-reference pulse generation circuit $71h_1$ to generate a time reference pulse.

Figure 12:
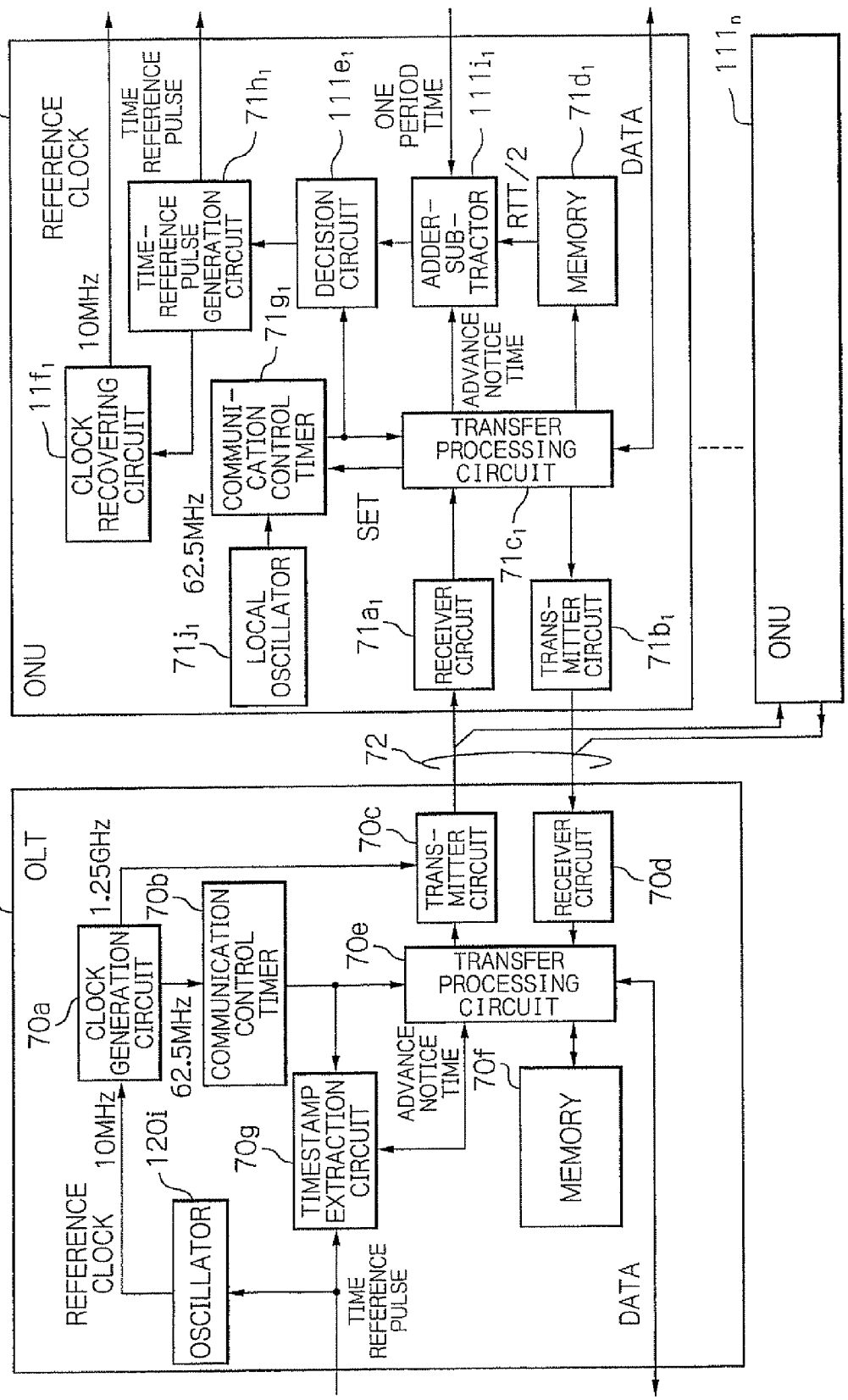
FIG. 12 is a block diagram schematically illustrating a configuration of a PON system in a modification of the embodiment of FIG. 11.

FIG. 12 schematically illustrates a configuration of a PON system in a modification of the embodiment of FIG. 11. In this modification, elements with the same operations and functions as those in the embodiments of FIGS. 7 and 11 are indicated using the same reference symbols.

The PON system in this modification has basically an OLT 120, a plurality of ONUs $111_1$-$111_n$ (n is an integer of two or more) assigned to a plurality of users, and an optical transmission line 72 for connecting the OLT 120 and the ONUs $111_1$-$111_n$.

The OLT 120 has a clock generation circuit 70a for generating clocks necessary in the PON system, a communication control timer 70b for time-keeping the present time, a transmitter circuit 70c, a receiver circuit 70d, a transfer processing circuit 70e for transferring down-signals to the transmitter circuit 70c and for receiving an up-signal from the receiver circuit 70d, a memory 70f for storing measured RTTs between the OLT 120 and each of the ONUs $111_1$-$111_n$, a timestamp extraction circuit 70g for extracting timestamps, and a synthesizer or oscillator 120i.

Each of the ONUs $111_1$-$111_n$, for example the ONU $111_1$, has a receiver circuit $71a_1$, a transmitter circuit $71b_1$, a transfer processing circuit $71c_1$ for receiving down-signals from the receiver circuit $71a_1$ and for transferring an up-signal to the transmitter circuit $71b_1$, a memory $71d_1$ for storing a half value of RTT, a decision circuit $111e_1$ for determining a corrected advance notice time and for generating in synchronization a time reference pulse, a clock recovering circuit $71f_1$ for recovering a reference clock, a communication control timer $71g_1$ for time-keeping in synchronization with the timestamp, a time-reference pulse generation circuit $71h_1$ for generating a time reference pulse, and an adder-subtractor $111i_1$.

In the PON system of this modification, since the OLT 120 has built-in the synthesizer or oscillator 120i for generating a reference clock of 10 MHz in response to the time reference pulse, it is not necessary to provide a reference clock from an external circuit.

Many widely different embodiments of the present invention may be constructed without departing from the spirit and scope of the present invention. It should be understood that the present invention is not limited to the specific embodiments described in the specification, except as defined in the appended claims.

The invention claimed is:

1. An optical transmission system including an optical terminal unit in network side and a plurality of optical terminal units in user side connected to said optical terminal unit in network side via an optical transmission line, said optical terminal unit in network side comprising:
a first transmitter and receiver means for transmitting and receiving signals with said plurality of optical terminal units in user side;
a first communication control timer;
a measurement means for measuring a round trip time between said optical terminal unit in network side and each of said plurality of optical terminal units in user side;
an advance notice time generation means for generating an advance notice time signal by adding a predetermined time to a time information that indicates a time in said first communication control timer in response to a first time reference pulse; and
means for controlling said first transmitter and receiver means to transmit the generated advance notice time signal to each of said plurality of optical terminal units in user side, and to transmit signals indicating half values of the measured round trip times to the respective ones of said plurality of optical terminal units in user side, each of said plurality of optical terminal units in user side comprising:
a second transmitter and receiver means for transmitting and receiving signals with said optical terminal unit in network side and for receiving the advance notice time signal and the signal indicating a half value of the measured round trip time from said optical terminal unit in network side;
a second communication control timer indicating a time delayed from that of said first communication control time by a delay time corresponding to a trip time from said optical terminal units in network side to this optical terminal unit in user side;
a decision means for calculating a corrected advance notice time by subtracting a time corresponding to the half value of the round trip time from the advance notice time received by said second transmitter and receiver means, and for judging whether the time indicated by said second communication control timer coincides with the corrected advance notice; and
a time-reference pulse generation means for generating a second time reference pulse when said decision means judges that the time indicated by said second communication control timer coincides with the corrected advance notice.

2. The optical transmission system as claimed in claim 1, wherein said measurement means in said optical terminal unit in network side comprises means for controlling said first transmitter and receiver means to transmit a time synchronization command containing the time information indicated in said first communication control timer to each of said plurality of optical terminal units in user side, and wherein each of said plurality of optical terminal units in user side comprises means for setting said second communication control timer to a time of the time information contained in the received time synchronization command.

3. The optical transmission system as claimed in claim 1, wherein said optical terminal unit in network side further comprises a clock generation means for generating a clock used in counting operation of said first communication control timer in response to a reference clock that is in synchronization with the first time reference pulse.

4. The optical transmission system as claimed in claim 3, wherein the reference clock is provided to said optical terminal unit in network side from an external circuit.

5. The optical transmission system as claimed in claim 3, wherein said optical terminal unit in network side further comprises an oscillation means for generating the reference clock in synchronous with the first time reference pulse.

6. An optical transmission system including an optical terminal unit in network side and a plurality of optical terminal units in user side connected to said optical terminal unit in network side via an optical transmission line, said optical terminal unit in network side comprising:
a first transmitter and receiver means for transmitting and receiving signals with said plurality of optical terminal units in user side;
a first communication control timer;
a measurement means for measuring a round trip time between said optical terminal unit in network side and each of said plurality of optical terminal units in user side;
an advance notice time generation means for generating an advance notice time signal that indicates a time in said first communication control timer in response to a first time reference pulse; and
means for controlling said first transmitter and receiver means to transmit the generated advance notice time signal to each of said plurality of optical terminal units in user side, and to transmit signals indicating half values of the measured round trip times to the respective ones of said plurality of optical terminal units in user side, each of said plurality of optical terminal units in user side comprising:

a second transmitter and receiver means for transmitting and receiving signals with said optical terminal unit in network side and for receiving the advance notice time signal and the signal indicating a half value of the measured round trip time from said optical terminal unit in network side;

a second communication control timer indicating a time delayed from that of said first communication control time by a delay time corresponding to a trip time from said optical terminal units in network side to this optical terminal unit in user side;

a decision means for calculating a corrected advance notice time by adding a predetermined time to the advance notice time received by said second transmitter and receiver means and by subtracting a time corresponding to the half value of the round trip time from the added advance notice time, and for judging whether the time indicated by said second communication control timer coincides with the corrected advance notice; and a time-reference pulse generation means for generating a second time reference pulse when said decision means judges that the time indicated by said second communication control timer coincides with the corrected advance notice.

7. The optical transmission system as claimed in claim 6, wherein said measurement means in said optical terminal unit in network side comprises means for controlling said first transmitter and receiver means to transmit a time synchronization command containing the time information indicated in said first communication control timer to each of said plurality of optical terminal units in user side, and wherein each of said plurality of optical terminal units in user side comprises means for setting said second communication control timer to a time of the time information contained in the received time synchronization command.

8. The optical transmission system as claimed in claim 6, wherein said optical terminal unit in network side further comprises a clock generation means for generating a clock used in counting operation of said first communication control timer in response to a reference clock that is in synchronization with the first time reference pulse.

9. The optical transmission system as claimed in claim 8, wherein the reference clock is provided to said optical terminal unit in network side from an external circuit.

10. The optical transmission system as claimed in claim 8, wherein said optical terminal unit in network side further comprises an oscillation means for generating the reference clock in synchronous with the first time reference pulse.

11. An optical transmission system including an optical terminal unit in network side and a plurality of optical terminal units in user side connected to said optical terminal unit in network side via an optical transmission line, said optical terminal unit in network side comprising:

a first transmitter and receiver means for transmitting and receiving signals with said plurality of optical terminal units in user side;

a first communication control timer;

a measurement means for measuring a round trip time between said optical terminal unit in network side and each of said plurality of optical terminal units in user side;

an advance notice time generation means for generating an advance notice time signal by adding a predetermined time to a time information that indicates a time in said first communication control timer in response to a first time reference pulse; and means for controlling said first transmitter and receiver means to transmit the generated advance notice time signal to each of said plurality of optical terminal units in user side, to transmit signals indicating half values of the measured round trip times to the respective ones of said plurality of optical terminal units in user side, and to transmit control messages, substantially all of which contain timestamps, to each of said plurality of optical terminal units in user side, each of said plurality of optical terminal units in user side comprising:

a second transmitter and receiver means for transmitting and receiving signals with said optical terminal unit in network side and for receiving the advance notice time signal and the signal indicating a half value of the measured round trip time from said optical terminal unit in network side;

a local oscillation means for generating a local clock;

a second communication control timer set by the timestamps contained in substantially all the control messages, for counting the local clock from said local oscillation means;

a decision means for calculating a corrected advance notice time by subtracting a time corresponding to the half value of the round trip time from the advance notice time received by said second transmitter and receiver means, and for judging whether the time indicated by said second communication control timer coincides with the corrected advance notice; and a time-reference pulse generation means for generating a second time reference pulse when said decision means judges that the time indicated by said second communication control timer coincides with the corrected advance notice.

12. The optical transmission system as claimed in claim 11, wherein said measurement means in said optical terminal unit in network side comprises means for controlling said first transmitter and receiver means to transmit a time synchronization command containing the time information indicated in said first communication control timer to each of said plurality of optical terminal units in user side, and wherein each of said plurality of optical terminal units in user side comprises means for setting said second communication control timer to a time of the time information contained in the received time synchronization command.

13. The optical transmission system as claimed in claim 11, wherein said optical terminal unit in network side further comprises a clock generation means for generating a clock used in counting operation of said first communication control timer in response to a reference clock that is in synchronization with the first time reference pulse.

14. The optical transmission system as claimed in claim 13, wherein the reference clock is provided to said optical terminal unit in network side from an external circuit.

15. The optical transmission system as claimed in claim 13, wherein said optical terminal unit in network side further comprises an oscillation means for generating the reference clock in synchronous with the first time reference pulse.

16. An optical transmission system including an optical terminal unit in network side and a plurality of optical terminal units in user side connected to said optical terminal unit in network side via an optical transmission line, said optical terminal unit in network side comprising:

a first transmitter and receiver means for transmitting and receiving signals with said plurality of optical terminal units in user side;

a first communication control timer;

a measurement means for measuring a round trip time between said optical terminal unit in network side and each of said plurality of optical terminal units in user side;
an advance notice time generation means for generating an advance notice time signal that indicates a time in said first communication control timer in response to a first time reference pulse; and
means for controlling said first transmitter and receiver means to transmit the generated advance notice time signal to each of said plurality of optical terminal units in user side, to transmit signals indicating half values of the measured round trip times to the respective ones of said plurality of optical terminal units in user side, and to transmit control messages, substantially all of which contain timestamps, to each of said plurality of optical terminal units in user side,
each of said plurality of optical terminal units in user side comprising:
a second transmitter and receiver means for transmitting and receiving signals with said optical terminal unit in network side and for receiving the advance notice time signal and the signal indicating a half value of the measured round trip time from said optical terminal unit in network side;
a local oscillation means for generating a local clock;
a second communication control timer set by the timestamps contained in substantially all the control messages, for counting the local clock from said local oscillation means;
a decision means for calculating a corrected advance notice time by adding a predetermined time to the advance notice time received by said second transmitter and receiver means and by subtracting a time corresponding to the half value of the round trip time from the added advance notice time, and for judging whether the time indicated by said second communication control timer coincides with the corrected advance notice; and
a time-reference pulse generation means for generating a second time reference pulse when said decision means judges that the time indicated by said second communication control timer coincides with the corrected advance notice.

17. The optical transmission system as claimed in claim 16, wherein said measurement means in said optical terminal unit in network side comprises means for controlling said first transmitter and receiver means to transmit a time synchronization command containing the time information indicated in said first communication control timer to each of said plurality of optical terminal units in user side, and wherein each of said plurality of optical terminal units in user side comprises means for setting said second communication control timer to a time of the time information contained in the received time synchronization command.

18. The optical transmission system as claimed in claim 16, wherein said optical terminal unit in network side further comprises a clock generation means for generating a clock used in counting operation of said first communication control timer in response to a reference clock that is in synchronization with the first time reference pulse.

19. The optical transmission system as claimed in claim 18, wherein the reference clock is provided to said optical terminal unit in network side from an external circuit.

20. The optical transmission system as claimed in claim 18, wherein said optical terminal unit in network side further comprises an oscillation means for generating the reference clock in synchronous with the first time reference pulse.

21. A synchronization method using a time reference pulse, for an optical transmission system including an optical terminal unit in network side and a plurality of optical terminal units in user side connected to said optical terminal unit in network side via an optical transmission line, said method comprising steps of:
measuring, at said optical terminal unit in network side, a round trip time between said optical terminal unit in network side and each of said plurality of optical terminal units in user side;
transmitting, from said optical terminal unit in network side, signals indicating half values of the measured round trip times to the respective ones of said plurality of optical terminal units in user side;
receiving, at each of said plurality of optical terminal units in user side, the signal indicating a half value of the measured round trip time from said optical terminal unit in network side, the received signal indicating a half value of the measured round trip time being stored;
transmitting, from said optical terminal unit in network side, an advance notice time signal obtained by adding a predetermined time to a time information that indicates a time in a first communication control timer in response to a first time reference pulse, to each of said plurality of optical terminal units in user side;
receiving, at each of said plurality of optical terminal units in user side, the advance notice time signal;
calculating, at each of said plurality of optical terminal units in user side, a corrected advance notice time by subtracting a time corresponding to the half value of the round trip time from the advance notice time received; and
generating, at each of said plurality of optical terminal units in user side, a second time reference pulse when a time indicated by a second communication control timer that indicates the time delayed from that of said first communication control time by a delay time corresponding to a trip time from said optical terminal units in network side to this optical terminal unit in user side coincides with the corrected advance notice.

22. A synchronization method using a time reference pulse, for an optical transmission system including an optical terminal unit in network side and a plurality of optical terminal units in user side connected to said optical terminal unit in network side via an optical transmission line, said method comprising steps of:
measuring, at said optical terminal unit in network side, a round trip time between said optical terminal unit in network side and each of said plurality of optical terminal units in user side;
transmitting, from said optical terminal unit in network side, signals indicating half values of the measured round trip times to the respective ones of said plurality of optical terminal units in user side;
receiving, at each of said plurality of optical terminal units in user side, the signal indicating a half value of the measured round trip time from said optical terminal unit in network side, the received signal indicating a half value of the measured round trip time being stored;
transmitting, from said optical terminal unit in network side, an advance notice time signal that indicates a time in a first communication control timer in response to a first time reference pulse, to each of said plurality of optical terminal units in user side;
receiving, at each of said plurality of optical terminal units in user side, the advance notice time signal;

calculating, at each of said plurality of optical terminal units in user side, a corrected advance notice time by adding a predetermined time to the advance notice time received and by subtracting a time corresponding to the half value of the round trip time from the added advance notice time; and generating, at each of said plurality of optical terminal units in user side, a second time reference pulse when a time indicated by a second communication control timer that indicates the time delayed from that of said first communication control time by a delay time corresponding to a trip time from said optical terminal units in network side to this optical terminal unit in user side coincides with the corrected advance notice.

23. A synchronization method using a time reference pulse, for an optical transmission system including an optical terminal unit in network side and a plurality of optical terminal units in user side connected to said optical terminal unit in network side via an optical transmission line, said method comprising steps of:

measuring, at said optical terminal unit in network side, a round trip time between said optical terminal unit in network side and each of said plurality of optical terminal units in user side;

transmitting, from said optical terminal unit in network side, signals indicating half values of the measured round trip times to the respective ones of said plurality of optical terminal units in user side;

receiving, at each of said plurality of optical terminal units in user side, the signal indicating a half value of the measured round trip time from said optical terminal unit in network side, the received signal indicating a half value of the measured round trip time being stored;

transmitting, from said optical terminal unit in network side, an advance notice time signal obtained by adding a predetermined time to a time information that indicates a time in a first communication control timer in response to a first time reference pulse, to each of said plurality of optical terminal units in user side;

transmitting, from said optical terminal unit in network side, control messages, substantially all of which contain timestamps, to each of said plurality of optical terminal units in user side;

receiving, at each of said plurality of optical terminal units in user side, the advance notice time signal;

calculating, at each of said plurality of optical terminal units in user side, a corrected advance notice time by subtracting a time corresponding to the half value of the round trip time from the advance notice time received; and generating, at each of said plurality of optical terminal units in user side, a second time reference pulse when a time indicated by a second communication control timer that is set by the timestamps contained in substantially all the control messages and counts local clock coincides with the corrected advance notice.

24. A synchronization method using a time reference pulse, for an optical transmission system including an optical terminal unit in network side and a plurality of optical terminal units in user side connected to said optical terminal unit in network side via an optical transmission line, said method comprising steps of:

measuring, at said optical terminal unit in network side, a round trip time between said optical terminal unit in network side and each of said plurality of optical terminal units in user side;

transmitting, from said optical terminal unit in network side, signals indicating half values of the measured round trip times to the respective ones of said plurality of optical terminal units in user side;

receiving, at each of said plurality of optical terminal units in user side, the signal indicating a half value of the measured round trip time from said optical terminal unit in network side, the received signal indicating a half value of the measured round trip time being stored;

transmitting, from said optical terminal unit in network side, an advance notice time signal that indicates a time in a first communication control timer in response to a first time reference pulse, to each of said plurality of optical terminal units in user side;

transmitting, from said optical terminal unit in network side, control messages, substantially all of which contain timestamps, to each of said plurality of optical terminal units in user side;

receiving, at each of said plurality of optical terminal units in user side, the advance notice time signal;

calculating, at each of said plurality of optical terminal units in user side, a corrected advance notice time by subtracting a time corresponding to the half value of the round trip time from the advance notice time received; and generating, at each of said plurality of optical terminal units in user side, a second time reference pulse when a time indicated by a second communication control timer that is set by the timestamps contained in substantially all the control messages and counts local clock coincides with the corrected advance notice.

* * * * *